(12) United States Patent
Kwong et al.

(10) Patent No.: US 12,739,407 B2
(45) Date of Patent: Sep. 15, 2026

(54) METHOD FOR ALL ZERO BLOCK DETECTION IN VERSATILE VIDEO CODING

(71) Applicant: City University of Hong Kong, Kowloon (CN)

(72) Inventors: Sam Tak Wu Kwong, Hong Kong (CN); Shiqi Wang, Hong Kong (CN); Zhenhao Sun, Hong Kong (CN)

(73) Assignee: City University of Hong Kong, Kowloon (CN)

( * ) Notice: Subject to any disclaimer, the term of this patent is extended or adjusted under 35 U.S.C. 154(b) by 45 days.

(21) Appl. No.: 18/820,755

(22) Filed: Aug. 30, 2024

(65) Prior Publication Data

US 2025/0142090 A1 May 1, 2025

Related U.S. Application Data

(60) Provisional application No. 63/594,129, filed on Oct. 30, 2023.

(51) Int. Cl.

| | |
|---|---|
| ***H04N 19/176*** | (2014.01) |
| ***H04N 19/12*** | (2014.01) |
| ***H04N 19/124*** | (2014.01) |
| ***H04N 19/147*** | (2014.01) |
| ***H04N 19/18*** | (2014.01) |
| ***H04N 19/60*** | (2014.01) |

(52) U.S. Cl.

CPC ........... *H04N 19/176* (2014.11); *H04N 19/12* (2014.11); *H04N 19/124* (2014.11); *H04N 19/147* (2014.11); *H04N 19/18* (2014.11); *H04N 19/60* (2014.11)

(58) Field of Classification Search

CPC .... H04N 19/176; H04N 19/12; H04N 19/124; H04N 19/147; H04N 19/18; H04N 19/60

See application file for complete search history.

(56) References Cited

U.S. PATENT DOCUMENTS 7,912,147 B2 * 3/2011 Liu ......................... H03M 7/30 375/295
10,708,594 B2 7/2020 Zhou et al.
2005/0197080 A1 * 9/2005 Ulupinar ............. H04B 7/0877 455/67.7

OTHER PUBLICATIONS

Meng Wang et al., ; "Low Complexity Quantization in High Efficiency Video Coding", DOI: 10,1109/ACCESS.2020.3012145, Aug. 19, 2020 (Year: 2020).*

Jing Cui et al., ; "Hybrid All Zero Soft Quantized Block Detection for HEVC", 1057-7149 © 2018 IEEE (Year: 2018).*

(Continued)

*Primary Examiner* — Dramos Kalapodas

(74) *Attorney, Agent, or Firm* — Dority & Manning, P.A.

(57) ABSTRACT

An AZB detection method for video coding, which includes the steps of detecting if a residual signal includes a spatial domain GAZB; detecting if the residual signal includes a frequency domain GAZB if no spatial domain GAZB is detected in the previous step; detecting if the residual signal includes a PAZB if no frequency domain GAZB is detected in the previous step; and determining that the residual signal is a non-AZB signal if no PAZB is detected in the previous step. The proposed method achieves promising time savings for test sequences of different resolutions, with negligible rate-distortion performance loss.

18 Claims, 15 Drawing Sheets

(56) References Cited

OTHER PUBLICATIONS

Kyujoong Lee ; "A Novel Algorithm for Zero Block Detection in High Efficiency Video Coding"; 1932-4553 © 2013 IEEE (Year: 2013).*
Siwei Ma et al., "Low Compexity Trellis-Coded Quantization in Versatile Video Coding", arXiv:2008.11420v1 [cs.MM] Aug. 26, 2020. (Year: 2020).*
Heiko Scwarz et al., "Quantization and Entropy Coding in the Versatile Vide Coding (VVC) Standard"; vol. 31 No. 10, Oct. 2021 © 2021 IEEE (Year: 2021).*
Bross et al, "Overview of the versatile video coding (VVC) standard and its applications," Transactions on Circuits and Systems for Video Technology, vol. 31, No. 10, pp. 3736-3764, 2021.
Wieckowski et al, "Fast partitioning decision strategies for the upcoming versatile video coding (VVC) standard," International Conference on Image Processing, 2019, pp. 4130-4134.
Saldanha et al, "Fast partitioning decision scheme for versatile video coding intra-frame prediction," International Symposium on Circuits and Systems, 2020, pp. 1-5.
Zhao et al, "Efficient VVC intra prediction based on deep feature fusion and probability estimation," arXiv:2205.03587v1, May 7, 2022, 10 pages.
Tissier et al, "Machine learning based efficient QT-MTT partitioning scheme for VVC intra encoders," Transactions on Circuits and Systems for Video Technology, 2023, 14 pages.
Wang et al, "Low Complexity Trellis-Coded Quantization in Versatile Video Coding," arXiv:2008.11420v1, Aug. 26, 2020, 13 pages.
Dong et al, "Fast Intra Mode Decision Algorithm for Versatile Video Coding," IEEE Transactions on Multimedia, vol. 24, pp. 400-414, 2021.
Wu et al, "HG-FCN: Hierarchical grid fully convolutional network for fast VVC intra coding," IEEE Trans. Circuits Syst. Video Technol., vol. 32, No. 8, pp. 5638-5649, 2022.
Liu et al, "Deep Multi-Task Learning Based Fast Intra-Mode Decision for Versatile Video Coding," IEEE Trans. Circuits Syst. Video Technol., 2023.
Park et al, "Learning-Based Early Transform Skip Mode Decision for VVC Screen Content Coding," IEEE Trans. Circuits Syst. Video Technol., 2023.
H. Yang et al."Low-complexity CTU Partition Structure Decision and Fast Intra Mode Decision for Versatile Video Coding," IEEE Trans. Circuits Syst. Video Technol., vol. 30, No. 6, pp. 1668-1682, 2019.
L. Sousa, "General method for eliminating redundant computations in video coding," Electronics Letters, vol. 36, No. 4, p. 1, 2000.
G. Y. Kim et al., "An early detection of all-zero DCT blocks in H. 264," in International Conference on Image Processing (ICIP), vol. 1. IEEE, 2004, pp. 453-456.
Y. H. Moon et al., "An improved early detection algorithm for all-zero blocks in H. 264 video encoding," IEEE Trans. Circuits Syst. Video Technol., vol. 15, No. 8, pp. 1053-1057, 2005.
H. Wang et al., "Analytical model of zero quantized DCT coefficients for video encoder optimization," in International Conference on Multimedia and Expo (ICME). IEEE, 2006, pp. 801-804.
H. Wang et al., "Effectively detecting all-zero DCT blocks for H. 264 optimization," in International Conference on Image Processing (ICIP). IEEE, 2006, pp. 1329-1332.
H. Wang et al., "Hybrid model to detect zero quantized DCT coefficients in H. 264," IEEE Trans. Multimed., vol. 9, No. 4, pp. 728-735, 2007.
H. Wang et al., "An efficient mode decision algorithm for H.264/AVC encoding optimization," IEEE Trans. Multimed., vol. 9, No. 4, pp. 882-888, 2007.
Z. Xie et al., "A general method for detecting all-zero blocks prior to DCT and quantization," IEEE Trans. Circuits Syst. Video Technol., vol. 17, No. 2, pp. 237-241, 2007.
D. Wu et al., "An adaptive thresholding technique for the detection of all-zeros blocks in H. 264," in International Conference on Image Processing (ICIP), vol. 5. IEEE, 2007, pp. V-329.
H. Wang et al., "Prediction of zero quantized DCT coefficients in H. 264/AVC using hadamard transformed information," IEEE Trans. Circuits Syst. Video Technol., vol. 18, No. 4, pp. 510-515, 2008.
Z. Liu et al., "Motion feature and Hadamard coefficient-based fast multiple reference frame motion estimation for H. 264," IEEE Trans. Circuits Syst. Video Technol., vol. 18, No. 5, pp. 620-632, 2008.
X. Ji et al., "Early determination of zero-quantized 8 x 8 DCT coefficients," IEEE Trans. Circuits Syst. Video Technol., vol. 19, No. 12, pp. 1755-1765, 2009.
K. Lee et al., "A novel algorithm for zero block detection in high efficiency video coding," IEEE Journal of Selected Topics in Signal Processing, vol. 7, No. 6, pp. 1124-1134, 2013.
H. Wang et al., "Early detection of all-zero 4×4 blocks in high efficiency video coding," Journal of Visual Communication and Image Representation, vol. 25, No. 7, pp. 1784-1790, 2014.
B. Lee et al., "An all-zero block detection scheme for low-complexity HEVC encoders," IEEE Trans. Multimed., vol. 18, No. 7, pp. 1257-1268, 2016.
H. Fan et al., "Hybrid zero block detection for high efficiency video coding," IEEE Trans. Multimed., vol. 18, No. 3, pp. 537-543, 2016.
M. Wang et al., "Fast rate distortion optimized quantization method for HEVC," in International Symposium on Circuits and Systems (ISCAS). IEEE, 2017, pp. 1-4.
M. Wang et al., "Fast rate distortion optimized quantization method based on early detection of zero block for HEVC," in IEEE Third International Conference on Multimedia Big Data (BigMM). IEEE, 2017, pp. 90-93.
H. Yin et al., "An efficient all-zero block detection algorithm for high efficiency video coding with RDOQ," Signal Processing: Image Communication, vol. 60, pp. 79-90, 2018.
J. Cui et al., "Hybrid all zero soft quantized block detection for HEVC," IEEE Trans. Image Process., vol. 27, No. 10, pp. 4987-5001, 2018.
X. Zhao et al., "Transform coding in the VVC standard," IEEE Trans. Circuits Syst. Video Technol., vol. 31, No. 10, pp. 3878-3890, 2021.
H. Schwarz et al., "Quantization and entropy coding in the versatile video coding (VVC) standard," IEEE Trans. Circuits Syst. Video Technol., vol. 31, No. 10, pp. 3891-3906, 2021.
D. Marpe et al., "The H. 264/MPEG4 advanced video coding standard and its applications," IEEE Commun. Mag., vol. 44, No. 8, pp. 134-143, 2006.
G. J. Sullivan et al., "Overview of the high efficiency video coding (HEVC) standard," IEEE Trans. Circuits Syst. Video Technol., vol. 22, No. 12, pp. 1649-1668, 2012.
T. Nguyen et al., "Transform coding techniques in HEVC," IEEE Journal of Selected Topics in Signal Processing, vol. 7, No. 6, pp. 978-989, 2013.
M. Koo et al., "Low frequency non-separable transform (LFNST)," in Picture Coding Symposium (PCS). IEEE, 2019, pp. 1-5.
H. Schwarz et al., "Hybrid video coding with trellis-coded quantization," in in Proc. Data Compress. Conf (DCC). IEEE, 2019, pp. 182-191.
J. Pfaff et al., "Video compression using generalized binary partitioning, trellis coded quantization, perceptually optimized encoding, and advanced prediction and transform coding," IEEE Trans. Circuits Syst. Video Technol., vol. 30, No. 5, pp. 1281-1295, 2019.
I.-M. Pao et al., "Modeling DCT coefficients for fast video encoding," IEEE Trans. Circuits Syst. Video Technol., vol. 9, No. 4, pp. 608-616, 1999.
Y.-W. Huang et al., "Block partitioning structure in the VVC standard," IEEE Trans. Circuits Syst. Video Technol., vol. 31, No. 10, pp. 3818-3833, 2021.
A. Wieckowski et al., "VVenC: An open and optimized VVC encoder implementation," in 2021 IEEE International Conference on Multimedia & Exp.

* cited by examiner

16 × 16

Laplacian Distribution 0.014
0.012
0.010
0.008
0.006
0.004
0.002
0.000

Frequency

−1000 −750 −500 −250 0 250 500 750

Coefficient Value

32 × 4

Laplacian Distribution 0.014
0.012
0.010
0.008
0.006
0.004
0.002
0.000

Frequency

−750 −500 −250 0 250 500 750

Coefficient Value

Residual Signal $\sum_i x_i < \theta_s$

No

Transform

Yes

Spatial domain GAZB $\forall i, t_i < \theta_f$

No

Yes

Frequency domain GAZB $\Delta D < \lambda \cdot \Delta R$

No

Non-AZB

Yes

PAZB

| -18 | -30 | 6 | 27 |
|---|---|---|---|
| 15 | 1 | 18 | -5 |
| 52 | -15 | -18 | -13 |
| -9 | -5 | 39 | -32 |

TABLE I

PERFORMANCE EVALUATIONS OF THE PROPOSED METHOD UNDER DIFFERENT ENCODING CONFIGURATIONS OF VVENC. VVENC SLOW PROFILE AND 20 THREADS SETTING ARE USED IN THIS EXPERIMENT.

| Class | Sequence | RA | | | | | LD | | | | | AI | | | | |
|---|---|---|---|---|---|---|---|---|---|---|---|---|---|---|---|---|
| | | BD-rate | $TS_T$ | $TS_Q$ | $TS_{total}$ | *fps* | BD-rate | $TS_T$ | $TS_Q$ | $TS_{total}$ | *fps* | BD-rate | $TS_T$ | $TS_Q$ | $TS_{total}$ | *fps* |
| B | BasketballDrive | 0.36% | 6.46% | 9.47% | 4.76% | 0.1479 | 0.36% | 9.15% | 17.85% | 6.90% | 0.0586 | 0.38% | 5.44% | 5.50% | 5.65% | 0.0598 |
| | BQTerrace | 0.27% | 8.01% | 9.90% | 4.42% | 0.2241 | 0.29% | 10.61% | 14.86% | 6.52% | 0.0833 | 0.27% | 4.08% | 4.47% | 4.13% | 0.0409 |
| | Cactus | 0.24% | 5.39% | 9.95% | 4.58% | 0.1836 | 0.29% | 7.46% | 19.76% | 7.07% | 0.0690 | 0.30% | 3.99% | 4.42% | 4.06% | 0.0441 |
| | MarketPlace | 0.21% | 6.84% | 8.97% | 3.53% | 0.2018 | 0.23% | 10.03% | 17.77% | 6.39% | 0.0840 | 0.18% | 5.37% | 5.47% | 4.77% | 0.0595 |
| | RitualDance | 0.37% | 8.05% | 9.04% | 3.88% | 0.1941 | 0.33% | 10.62% | 14.33% | 5.13% | 0.0780 | 0.30% | 3.78% | 3.85% | 3.75% | 0.0665 |
| C | BasketballDrill | 0.35% | 4.43% | 9.41% | 4.19% | 0.4627 | 0.34% | 7.14% | 18.13% | 6.26% | 0.1741 | 0.46% | 0.94% | 3.40% | 5.49% | 0.1198 |
| | BQMall | 0.31% | 5.98% | 8.30% | 3.07% | 0.5145 | 0.26% | 9.99% | 17.94% | 5.64% | 0.2111 | 0.29% | 8.73% | 8.05% | 8.45% | 0.1308 |
| | PartyScene | 0.22% | 4.58% | 7.52% | 3.04% | 0.3603 | 0.20% | 7.57% | 15.44% | 5.97% | 0.1334 | 0.20% | 1.54% | 2.72% | 2.47% | 0.0863 |
| | RaceHorses | 0.23% | 4.74% | 8.61% | 4.25% | 0.2958 | 0.27% | 7.42% | 15.06% | 6.05% | 0.1213 | 0.33% | 4.59% | 6.07% | 4.05% | 0.1459 |
| D | BasketbalPass | 0.33% | 4.56% | 9.16% | 3.76% | 0.8874 | 0.30% | 6.87% | 16.13% | 5.00% | 0.3538 | 0.24% | 1.37% | 4.50% | 3.51% | 0.3531 |
| | BQSquare | 0.21% | 6.64% | 8.04% | 2.66% | 1.3749 | 0.17% | 11.59% | 14.17% | 6.18% | 0.4514 | 0.27% | 2.47% | 4.81% | 3.70% | 0.2705 |
| | BlowingBubbles | 0.10% | 3.56% | 8.81% | 3.15% | 0.9274 | 0.10% | 6.36% | 17.52% | 5.86% | 0.3687 | 0.20% | 0.14% | 3.33% | 2.27% | 0.2265 |
| | RaceHorses | 0.37% | 4.53% | 10.27% | 4.36% | 0.6982 | 0.17% | 7.40% | 16.95% | 5.93% | 0.2927 | 0.33% | 2.06% | 4.96% | 3.82% | 0.3622 |
| E | FourPeople | 0.30% | 7.88% | 8.47% | 3.15% | 0.6164 | 0.49% | 13.11% | 18.70% | 5.58% | 0.3084 | 0.40% | 3.28% | 3.66% | 3.81% | 0.0864 |
| | Johnny | 0.41% | 11.22% | 10.84% | 3.73% | 0.8078 | 0.37% | 16.22% | 21.54% | 6.27% | 0.4005 | 0.38% | 12.93% | 13.65% | 9.93% | 0.1293 |
| | KristenAndSara | 0.38% | 9.74% | 8.86% | 3.35% | 0.7051 | 0.64% | 14.79% | 19.51% | 5.45% | 0.3322 | 0.37% | 5.15% | 5.39% | 4.08% | 0.1372 |
| F | BasketballDrillText | 0.34% | 4.29% | 9.06% | 3.90% | 0.4731 | 0.21% | 7.31% | 18.02% | 6.36% | 0.1736 | 0.49% | -3.93% | -0.55% | -0.92% | 0.1162 |
| | ArenaOfValor | 0.18% | 5.15% | 7.40% | 3.47% | 0.3361 | 0.27% | 8.64% | 16.52% | 6.78% | 0.1385 | 0.24% | 4.90% | 4.71% | 3.86% | 0.0669 |
| | SlideEditing | 0.18% | 5.96% | 4.85% | 2.42% | 0.5835 | 0.62% | 11.18% | 9.03% | 4.94% | 0.4367 | 0.47% | 5.44% | 4.69% | 2.33% | 0.0564 |
| | SlideShow | 0.71% | 10.92% | 7.34% | 2.69% | 0.3740 | 0.80% | 17.42% | 11.72% | 5.46% | 0.1706 | 0.71% | 6.97% | 5.36% | 3.21% | 0.1470 |
| | Class B | 0.29% | 6.95% | 9.45% | 4.23% | 0.1886 | 0.30% | 9.59% | 16.97% | 6.41% | 0.0741 | 0.28% | 4.47% | 4.72% | 4.48% | 0.0523 |
| | Class C | 0.28% | 4.81% | 8.59% | 3.64% | 0.4087 | 0.27% | 7.80% | 16.84% | 5.98% | 0.1592 | 0.32% | 3.24% | 4.51% | 5.14% | 0.1144 |
| | Class D | 0.25% | 4.61% | 9.10% | 3.48% | 0.9651 | 0.18% | 7.89% | 16.15% | 5.75% | 0.3708 | 0.26% | 1.42% | 4.27% | 3.33% | 0.2849 |
| | Class E | 0.36% | 9.39% | 9.23% | 3.41% | 0.7012 | 0.50% | 14.51% | 19.75% | 5.77% | 0.3429 | 0.38% | 6.72% | 7.16% | 5.99% | 0.1128 |
| | Class F | 0.35% | 5.47% | 7.45% | 3.12% | 0.4112 | 0.47% | 9.02% | 15.79% | 5.89% | 0.1764 | 0.48% | 3.72% | 3.96% | 2.14% | 0.0802 |
| Overall(w/o D,F) | | 0.30% | 6.94% | 9.11% | 3.83% | - | 0.34% | 10.34% | 17.57% | 6.10% | - | 0.32% | 4.99% | 5.55% | 5.05% | - |

Fig. 7

RaceHorsesC

Anchor
Proposed
PSNR
38
37
36
35
34
33
32
31
30
29
500
1000
1500
2000
2500
3000
3500
4000
35.2
35.0
1681
1697
1713
32.2
32.0
800
808
816
Bitrate

TABLE II

PERFORMANCE OF GAZB AND PAZB DETECTION UNDER THE RA CONFIGURATION. VVENC SLOW PROFILE AND 20 THREADS SETTINGS ARE USED IN THIS EXPERIMENT.

| Class | Sequence | GAZB | | | | | PAZB | | | | |
|---|---|---|---|---|---|---|---|---|---|---|---|
| | | BDBR | $TS_T$ | $TS_Q$ | $TS_{total}$ | *fps* | BDBR | $TS_T$ | $TS_Q$ | $TS_{total}$ | *fps* |
| B | BasketballDrive | 0.25% | 4.86% | 7.65% | 3.73% | 0.1467 | 0.20% | -0.12% | 2.94% | 0.56% | 0.1415 |
| | BQTerrace | 0.15% | 6.43% | 7.74% | 3.06% | 0.2213 | 0.16% | -1.00% | 3.04% | 0.97% | 0.2165 |
| | Cactus | 0.19% | 3.62% | 8.25% | 3.69% | 0.1818 | 0.10% | 0.03% | 2.85% | 0.68% | 0.1760 |
| | MarketPlace | 0.11% | 5.43% | 7.74% | 2.52% | 0.1998 | 0.09% | -0.97% | 2.72% | 0.29% | 0.1957 |
| | RitualDance | 0.22% | 7.17% | 7.66% | 2.87% | 0.1917 | 0.13% | 0.23% | 2.15% | 0.24% | 0.1872 |
| C | BasketballDrill | 0.16% | 3.29% | 8.19% | 3.61% | 0.4599 | 0.13% | 0.16% | 3.02% | 1.23% | 0.4490 |
| | BQMall | 0.22% | 5.38% | 7.71% | 2.89% | 0.5140 | 0.09% | -1.86% | 1.47% | -0.35% | 0.4974 |
| | PartyScene | 0.17% | 3.35% | 6.64% | 2.52% | 0.3583 | 0.01% | -1.15% | 1.79% | 0.22% | 0.3503 |
| | RaceHorses | 0.21% | 3.52% | 7.55% | 3.75% | 0.2951 | 0.20% | -0.82% | 2.67% | 1.05% | 0.2871 |
| D | BasketbalPass | 0.22% | 3.87% | 8.12% | 3.30% | 0.8825 | 0.13% | -0.02% | 2.07% | 0.32% | 0.8589 |
| | BQSquare | -0.15% | 6.36% | 7.37% | 2.30% | 1.3699 | 0.02% | -1.53% | 2.89% | 0.42% | 1.3455 |
| | BlowingBubbles | 0.16% | 2.58% | 8.06% | 2.90% | 0.9236 | 0.13% | -1.27% | 1.99% | 0.19% | 0.9007 |
| | RaceHorses | 0.24% | 2.51% | 8.58% | 3.57% | 0.6918 | 0.23% | -1.51% | 2.40% | 0.54% | 0.6725 |
| E | FourPeople | 0.24% | 6.37% | 7.54% | 2.44% | 0.6123 | 0.08% | 0.21% | 2.19% | 0.60% | 0.6015 |
| | Johnny | 0.30% | 10.17% | 9.06% | 2.67% | 0.7995 | 0.28% | 0.03% | 2.91% | 0.62% | 0.7827 |
| | KristenAndSara | 0.22% | 9.13% | 8.09% | 2.75% | 0.7020 | 0.09% | 1.08% | 2.15% | 0.60% | 0.6880 |
| F | BasketballDrillText | 0.23% | 3.12% | 8.02% | 3.80% | 0.4724 | 0.11% | 0.13% | 2.95% | 0.91% | 0.4593 |
| | ArenaOfValor | 0.19% | 4.22% | 6.92% | 3.03% | 0.3353 | 0.01% | -0.66% | 2.20% | 0.00% | 0.3252 |
| | SlideEditing | 0.07% | 6.31% | 5.05% | 2.59% | 0.5846 | -0.23% | -2.09% | 0.54% | 0.36% | 0.5718 |
| | SlideShow | 0.85% | 11.32% | 7.52% | 2.47% | 0.3734 | -0.10% | -1.59% | 1.44% | 0.20% | 0.3651 |
| | Class B | 0.19% | 5.52% | 7.80% | 3.18% | 0.1866 | 0.14% | -0.31% | 2.74% | 0.55% | 0.1816 |
| | Class C | 0.19% | 3.73% | 7.60% | 3.19% | 0.4072 | 0.11% | -0.69% | 2.36% | 0.54% | 0.3965 |
| | Class D | 0.11% | 3.54% | 8.06% | 3.02% | 0.9598 | 0.13% | -0.92% | 2.28% | 0.37% | 0.9363 |
| | Class E | 0.25% | 8.33% | 8.13% | 2.62% | 0.6963 | 0.15% | 0.49% | 2.37% | 0.61% | 0.6828 |
| | Class F | 0.33% | 4.67% | 7.01% | 2.98% | 0.4106 | -0.05% | -0.64% | 2.05% | 0.37% | 0.3994 |
| Overall (w/o D,F) | | 0.20% | 5.73% | 7.82% | 3.04% | - | 0.13% | -0.35% | 2.49% | 0.56% | - |

Fig. 9

METHOD FOR ALL ZERO BLOCK DETECTION IN VERSATILE VIDEO CODING

CROSS-REFERENCE TO RELATED APPLICATIONS

The present application is based upon and claims the right of priority to U.S. Provisional Patent Application No. 63/594,129, filed Oct. 30, 2023, the disclosure of which is hereby incorporated by reference herein in its entirety for all purposes.

FIELD OF INVENTION

This invention relates to video compression, and in particular to reduction of encoding time during video compression.

BACKGROUND OF INVENTION

Video compression is a critical technique for efficient storage and transmission of video data, which ensures optimal use of resources and seamless streaming. Better video compression technique guarantees to reduce storage cost and conserves bandwidth for transmission. According to the latest statistic by YouTube™, over 500 hours of video content are uploaded every minute. This brings tremendous challenge for effectively storing and transmitting such amount of video data.

The Versatile Video Coding (VVC) standard [1], which follows the hybrid coding framework, is the latest generation of video coding standard developed jointly by ITU-T Video Coding Experts Group (VCEG) and the ISO/IEC Moving Picture Experts Group (MPEG). VVC adopts many new techniques in an effort to achieve higher compression efficiency and cater to the increasing demand for high-quality video content, especially in the era of 4K resolution TVs and the growing share of Internet-based video in global data traffic. Compared with the previous video coding standard, High Efficiency Video Coding (HEVC), VVC promises to reduce the video bitrate by nearly 50% at equal video quality. Improvements in coding efficiency are mainly due to the introduction of elaborate coding tools for more accurate prediction during the encoding phase. With more partitioning and prediction modes, the encoding complexity has also been greatly improved. According to [1], the encoding complexity of reference software VVC test model VTM is around 8 times higher than HEVC reference software. To reduce the overall encoding time, several works are proposed to reduce the complexity of the encoding of different aspects [2]-[10]. The multitype tree (MTT) partitioning scheme significantly improves the coding efficiency at the cost of a high computational effort, limiting its adoption for real applications. In [2]-[5], the works focus on reducing the computational complexity introduced by the flexible MTT partitioning scheme in VVC. On the other hand, since VVC introduces many prediction modes, [7]-[11] focus on fast mode decision, including fast intra mode decision and fast transform mode decision.

In video coding, transform and quantization account for a significant portion of the overall encoding time, as a series of new coding tools for transform and quantization have been introduced. Therefore, optimizing these modules has become imperative to economize the encoding complexity. One promising direction is to early detect all-zero blocks (AZB) in a low-complexity way. By identifying the AZB in advance, which contains only zero values after inverse quantization and inverse transform, the encoder can skip unnecessary calculations, such that significant computational savings can be achieved. In earlier research, several methods for AZB detection in H.264/AVC [12]-[23] and H.265/HEVC [24]-[31] have been developed. In H.264/AVC, AZB detection methods mainly employ the sum of absolute difference (SAD) and the sum of absolute transform difference (SATD) to skip transform and quantization. These methods mostly rely on the modeling of the transform coefficients and build an explicit relationship between SAD/SATD and the condition of AZB. For H.265/HEVC, new challenges arise due to larger transform block sizes and the involvement of the rate-distortion optimized quantization (RDOQ). In addition to the coefficient modeling for detecting genuine all-zero block (GAZB) introduced by hard quantization, the rate-distortion (RD) estimation method has been investigated for detecting pseudo all-zero block (PAZB). These techniques reduce the complexity of the encoding and reveal the importance of early detection of AZB for future video coding standards. In VVC, a series of coding tools that have been adopted to improve coding efficiency pose unique challenges to the design of the AZB detection method tailored for VVC. For example, the larger transform block 64×64 in VVC is a new transform block size that does not exist in H.264/AVC or H.265/HEVC. In addition, the non-square transform block in VVC is supported to accommodate the flexible partitioning [32]. FIGS. 1*a* and 1*b* show frequencies of AZB and non-AZB for four QPs (22, 27, 32, 37). The test sequence is BasketballDrive, and the test is conducted under random access (RA) configuration with the slow profile of VVenC. As shown in FIGS. 1*a*-1*b*, the diverse sizes and shapes of blocks bring new challenges for AZB detection. Moreover, the trellis quantization, which relies on the trellis graph for dependent quantization, converts the philosophy of quantization from scalar to vector by seeking the optimal path [33]. Therefore, it is apparent that straightforwardly adopting the existing methods for VVC cannot bridge the gap.

REFERENCES

All referenced literatures throughout this disclosure are incorporated herein by reference in their entirety, which include the following references:

[1] B. Bross, Y.-K. Wang, Y. Ye, S. Liu, J. Chen, G. J. Sullivan, and J.-R. Ohm, "Overview of the versatile video coding (VVC) standard and its applications," IEEE Trans. Circuits Syst. Video Technol., vol. 31, no. 10, pp. 3736-3764, 2021.

[2] A. Wieckowski, J. Ma, H. Schwarz, D. Marpe, and T. Wiegand, "Fast partitioning decision strategies for the upcoming versatile video coding (VVC) standard," in 2019 IEEE International Conference on Image Processing (ICIP). IEEE, 2019, pp. 4130-4134.

[3] M. Saldanha, G. Sanchez, C. Marcon, and L. Agostini, "Fast partitioning decision scheme for versatile video coding intra-frame prediction," in 2020 IEEE International Symposium on Circuits and Systems (ISCAS). IEEE, 2020, pp. 1-5.

[4] T. Zhao, Y. Huang, W. Feng, Y. Xu, and S. Kwong, "Efficient VVC intra prediction based on deep feature fusion and probability estimation," IEEE Trans. Multimed., 2022.

[5] A. Tissier, W. Hamidouche, S. B. D. Mdalsi, J. Vanne, F. Galpin, and D. Menard, "Machine learning based efficient qt-mtt partitioning scheme for VVC intra encoders," IEEE Trans. Circuits Syst. Video Technol., 2023.

[6] M. Wang, S. Wang, J. Li, L. Zhang, Y. Wang, S. Ma, and S. Kwong, "Low complexity trellis-coded quantization in versatile video coding," IEEE Trans. Image Process., vol. 30, pp. 2378-2393, 2021.

[7] X. Dong, L. Shen, M. Yu, and H. Yang, "Fast intra mode decision algorithm for versatile video coding," IEEE Trans. Multimed., vol. 24, pp. 400-414, 2021.

[8] S. Wu, J. Shi, and Z. Chen, "HG-FCN: Hierarchical grid fully convolutional network for fast VVC intra coding," IEEE Trans. Circuits Syst. Video Technol., vol. 32, no. 8, pp. 5638-5649, 2022.

[9] Z. Liu, T. Li, Y. Chen, K. Wei, M. Xu, and H. Qi, "Deep multi-task learning based fast intra-mode decision for versatile video coding," IEEE Trans. Circuits Syst. Video Technol., 2023.

[10] J. Park, J. Lee, B. Kim, and B. Jeon, "Learning-based early transform skip mode decision for VVC screen content coding," IEEE Trans. Circuits Syst. Video Technol., 2023.

[11] H. Yang, L. Shen, X. Dong, Q. Ding, P. An, and G. Jiang, "Low-complexity ctu partition structure decision and fast intra mode decision for versatile video coding," IEEE Trans. Circuits Syst. Video Technol., vol. 30, no. 6, pp. 1668-1682, 2019.

[12] L. Sousa, "General method for eliminating redundant computations in video coding," Electronics Letters, vol. 36, no. 4, p. 1, 2000.

[13] G. Y. Kim, Y. H. Moon, and J. H. Kim, "An early detection of all-zero DCT blocks in H. 264," in International Conference on Image Processing (ICIP), vol. 1. IEEE, 2004, pp. 453-456.

[14] Y. H. Moon, G. Y. Kim, and J. H. Kim, "An improved early detection algorithm for all-zero blocks in H. 264 video encoding," IEEE Trans. Circuits Syst. Video Technol., vol. 15, no. 8, pp. 1053-1057, 2005.

[15] H. Wang, S. Kwong, and C.-W. Kok, "Analytical model of zero quantized DCT coefficients for video encoder optimization," in International Conference on Multimedia and Expo (ICME). IEEE, 2006, pp. 801-804.

[16] WANG, H., KWONG, S., & KOK, C.-W., "Effectively detecting all-zero DCT blocks for H. 264 optimization," in International Conference on Image Processing (ICIP). IEEE, 2006, pp. 1329-1332.

[17] H. Wang and S. Kwong, "Hybrid model to detect zero quantized DCT coefficients in H. 264," IEEE Trans. Multimed., vol. 9, no. 4, pp. 728-735, 2007.

[18] H. Wang, S. Kwong, and C.-W. Kok, "An efficient mode decision algorithm for H.264/AVC encoding optimization," IEEE Trans. Multimed., vol. 9, no. 4, pp. 882-888, 2007.

[19] Z. Xie, Y. Liu, J. Liu, and T. Yang, "A general method for detecting all-zero blocks prior to DCT and quantization," IEEE Trans. Circuits Syst. Video Technol., vol. 17, no. 2, pp. 237-241, 2007.

[20] D. Wu, K. P. Lim, T. K. Chiew, J. Y. Tham, and K. Goh, "An adaptive thresholding technique for the detection of all-zeros blocks in H. 264," in International Conference on Image Processing (ICIP), vol. 5. IEEE, 2007, pp. V-329.

[21] H. Wang and S. Kwong, "Prediction of zero quantized DCT coefficients in H. 264/AVC using hadamard transformed information," IEEE Trans. Circuits Syst. Video Technol., vol. 18, no. 4, pp. 510-515, 2008.

[22] Z. Liu, L. Li, Y. Song, S. Li, S. Goto, and T. Ikenaga, "Motion feature and Hadamard coefficient-based fast multiple reference frame motion estimation for H. 264," IEEE Trans. Circuits Syst. Video Technol., vol. 18, no. 5, pp. 620-632, 2008.

[23] X. Ji, S. Kwong, D. Zhao, H. Wang, C.-C. J. Kuo, and Q. Dai, "Early determination of zero-quantized 8×8 DCT coefficients," IEEE Trans. Circuits Syst. Video Technol., vol. 19, no. 12, pp. 1755-1765, 2009.

[24] K. Lee, H.-J. Lee, J. Kim, and Y. Choi, "A novel algorithm for zero block detection in high efficiency video coding," IEEE Journal of Selected Topics in Signal Processing, vol. 7, no. 6, pp. 1124-1134, 2013.

[25] H. Wang, H. Du, W. Lin, S. Kwong, O. C. Au, J. Wu, and Z. Wei, "Early detection of all-zero 4× 4 blocks in high efficiency video coding," Journal of Visual Communication and Image Representation, vol. 25, no. 7, pp. 1784-1790, 2014.

[26] B. Lee, J. Jung, and M. Kim, "An all-zero block detection scheme for low-complexity HEVC encoders," IEEE Trans. Multimed., vol. 18, no. 7, pp. 1257-1268, 2016.

[27] H. Fan, R. Wang, L. Ding, X. Xie, H. Jia, and W. Gao, "Hybrid zero block detection for high efficiency video coding," IEEE Trans. Multimed., vol. 18, no. 3, pp. 537-543, 2016.

[28] M. Wang, X. Xie, H. Fan, S. Wang, J. Li, S. Dong, G. Xiang, and H. Jia, "Fast rate distortion optimized quantization method for HEVC," in International Symposium on Circuits and Systems (ISCAS). IEEE, 2017, pp. 1-4.

[29] M. Wang, X. Xie, J. Li, H. Jia, and W. Gao, "Fast rate distortion optimized quantization method based on early detection of zero block for HEVC," in IEEE Third International Conference on Multimedia Big Data (BigMM). IEEE, 2017, pp. 90-93.

[30] H. Yin, H. Cai, E. Yang, Y. Zhou, and J. Wu, "An efficient all-zero block detection algorithm for high efficiency video coding with RDOQ," Signal Processing: Image Communication, vol. 60, pp. 79-90, 2018.

[31] J. Cui, R. Xiong, X. Zhang, S. Wang, S. Wang, S. Ma, and W. Gao, "Hybrid all zero soft quantized block detection for HEVC," IEEE Trans. Image Process., vol. 27, no. 10, pp. 4987-5001, 2018.

[32] X. Zhao, S.-H. Kim, Y. Zhao, H. E. Egilmez, M. Koo, S. Liu, J. Lainema, and M. Karczewicz, "Transform coding in the VVC standard," IEEE Trans. Circuits Syst. Video Technol., vol. 31, no. 10, pp. 3878-3890, 2021.

[33] H. Schwarz, M. Coban, M. Karczewicz, T.-D. Chuang, F. Bossen, A. Alshin, J. Lainema, C. R. Helmrich, and T. Wiegand, "Quantization and entropy coding in the versatile video coding (VVC) standard," IEEE Trans. Circuits Syst. Video Technol., vol. 31, no. 10, pp. 3891-3906, 2021.

[34] D. Marpe, T. Wiegand, and G. J. Sullivan, "The H. 264/MPEG4 advanced video coding standard and its applications," IEEE Commun. Mag., vol. 44, no. 8, pp. 134-143, 2006.

[35] G. J. Sullivan, J.-R. Ohm, W.-J. Han, and T. Wiegand, "Overview of the high efficiency video coding (HEVC) standard," IEEE Trans. Circuits Syst. Video Technol., vol. 22, no. 12, pp. 1649-1668, 2012.

[36] T. Nguyen, P. Helle, M. Winken, B. Bross, D. Marpe, H. Schwarz, and T. Wiegand, "Transform coding techniques in HEVC," IEEE Journal of Selected Topics in Signal Processing, vol. 7, no. 6, pp. 978-989, 2013.

[37] M. Koo, M. Salehifar, J. Lim, and S.-H. Kim, "Low frequency non-separable transform (LFNST)," in Picture Coding Symposium (PCS). IEEE, 2019, pp. 1-5.

[38] H. Schwarz, T. Nguyen, D. Marpe, and T. Wiegand, "Hybrid video coding with trellis-coded quantization," in in Proc. Data Compress. Conf (DCC). IEEE, 2019, pp. 182-191.

[39] J. Pfaff, H. Schwarz, D. Marpe, B. Bross, S. De-Luxa'n-Hernandez, P. Helle, C. R. Helmrich, T. Hinz, W.-Q. Lim, J. Ma et al., "Video compression using generalized binary partitioning, trellis coded quantization, perceptually optimized encoding, and advanced prediction and transform coding," IEEE Trans. Circuits Syst. Video Technol., vol. 30, no. 5, pp. 1281-1295, 2019.

[40] I.-M. Pao and M.-T. Sun, "Modeling DCT coefficients for fast video encoding," IEEE Trans. Circuits Syst. Video Technol., vol. 9, no. 4, pp. 608-616, 1999.

[41] Y.-W. Huang, J. An, H. Huang, X. Li, S.-T. Hsiang, K. Zhang, H. Gao, J. Ma, and O. Chubach, "Block partitioning structure in the VVC standard," IEEE Trans. Circuits Syst. Video Technol., vol. 31, no. 10, pp. 3818-3833, 2021.

[42] A. K. Jain, Fundamentals of Digital Image Processing. Prentice-Hall, Inc., 1989.

[43] A. Wieckowski, J. Brandenburg, T. Hinz, C. Bartnik, V. George, G. Hege, C. Helmrich, A. Henkel, C. Lehmann, C. Stoffers et al., "VVenC: An open and optimized VVC encoder implementation," in 2021 IEEE International Conference on Multimedia & Expo Workshops (ICMEW). IEEE, 2021, pp. 1-2.

SUMMARY OF INVENTION

In view of the shortcoming of conventional methods as mentioned above, a new AZB detection for VVC is thus highly desired. The proposed invention aims to reduce the total complexity of the latest video coding standard VVC, reduce the time consumption for processing such amount of video data.

In one aspect of the invention, there is provided a GAZB detection method which considers the variable transform sizes in VVC. In particular, the residual distributions under different transform sizes are modeled to establish the relationship between AZB and the sum of absolute difference of residual blocks.

In another aspect of the invention, there is provided a PAZB detection method which considers the trellis graph-based path search in VVC. In particular, the rate-distortion cost estimation as well as the number and the magnitude of the significant coefficients are employed for PAZB detection.

In a further aspect of the invention, there is provided an AZB detection method for video coding, which includes the steps of detecting if a residual signal includes a spatial domain GAZB; detecting if the residual signal includes a frequency domain GAZB if no spatial domain GAZB is detected in the previous step; detecting if the residual signal includes a PAZB if no frequency domain GAZB is detected in the previous step; and determining that the residual signal is a non-AZB signal if no PAZB is detected in the previous step.

In some embodiments, the method further includes, before the step of detecting if a residual signal includes a spatial domain GAZB, a step of validating a distribution of multiple residual signals for both square and non-square residual blocks.

In some embodiments, the distribution is approximated by a Laplacian distribution.

In some embodiments, the step of detecting if a residual signal includes a spatial domain GAZB, further includes a step of assessing if a SAD of the residual signal is smaller than an SAD upper threshold, and a step of determining that the residual signal includes the spatial domain GAZB if the SAD is smaller than the SAD upper threshold.

In some embodiments, the SAD upper threshold is derived at least based on a theoretical coefficient upper bound in a frequency domain.

In some embodiments, the SAD upper threshold is derived at least based on a block size of the residual signal.

In some embodiments, both the SAD upper threshold and the theoretical coefficient upper bound are determined only by a block size of the residual signal, a Quantization Parameter (QP), and a transform type.

In some embodiments, both the upper threshold and the theoretical coefficient upper bound are pre-calculated and stored in a look-up table prior to the step of detecting if a residual signal includes a spatial domain GAZB.

In some embodiments, the step of detecting if the residual signal includes a frequency domain GAZB, further includes a step of assessing if a last significant coefficient in a transform block of the residual signal is larger than a theoretical coefficient upper bound in a frequency domain, and a step of determining that the residual signal includes the frequency domain GAZB if the last significant coefficient is larger than the theoretical coefficient upper bound.

In some embodiments, the last significant coefficient is determined by applying the theoretical coefficient upper bound to each transform coefficient in inverse scan order.

In some embodiments, the step of detecting if the residual signal includes a frequency domain GAZB, further includes a step of attempting to find a last significant coefficient in a transform block of the residual signal, and a step of determining that the residual signal comprises the frequency domain GAZB if no said last significant coefficient can be found.

In some embodiments, the step further includes, after the step of detecting if the residual signal includes a frequency domain GAZB, a step of building a trellis graph from a last significant coefficient in a transform block of the residual signal to a top-left significant coefficient.

In some embodiments, the step of detecting if the residual signal includes a PAZB, detects if the residual signal comprises the PAZB that is caused by a trellis-coded quantization (TCQ).

In some embodiments, the step of detecting if the residual signal includes a PAZB, further includes a step of determining if the residual signal includes the PAZB or includes no AZB by using a RD estimation.

In some embodiments, the TCQ is skipped if the residual signal includes a PAZB.

In some embodiments, the step of detecting if the residual signal includes a PAZB, further includes detecting if the residual signal contains the PAZB, by assessing whether a smallest RD cost occurs when all indices are quantized to zeros.

In some embodiments, the step of detecting if the residual signal includes a PAZB, further includes a step of calculating if a ratio of large coefficients is larger than a theoretical coefficient upper bound in a frequency domain; and a step of determining that the residual signal comprises the PAZB if the ratio is larger than the theoretical coefficient upper bound.

According to a further aspect of the invention, there is provided a non-transitory computer-readable medium, having stored thereon program instructions that, upon execution by a computing device, cause the computing device to perform the method which includes the steps of detecting if a residual signal includes a spatial domain GAZB; detecting if the residual signal includes a frequency domain GAZB if no spatial domain GAZB is detected in the previous step; detecting if the residual signal includes a PAZB if no frequency domain GAZB is detected in the previous step; and determining that the residual signal is a non-AZB signal if no PAZB is detected in the previous step.

According to a further aspect of the invention, there is provided a computing system which includes one or more processors; and memory containing instructions that, when executed by the one or more processors, cause the computing system to perform a method which includes the steps of detecting if a residual signal includes a spatial domain GAZB; detecting if the residual signal includes a frequency domain GAZB if no spatial domain GAZB is detected in the previous step; detecting if the residual signal includes a PAZB if no frequency domain GAZB is detected in the previous step; and determining that the residual signal is a non-AZB signal if no PAZB is detected in the previous step.

Exemplary embodiments of the invention therefore provide an AZB detection scheme with the collaboration of GAZB and PAZB detection tailored for VVC. Compared with previous methods, the detection scheme is specially designed for the latest video coding standard, achieving better time saving compared with less quality loss. The detection scheme achieves promising time savings for test sequences of different resolutions, with negligible rate-distortion performance loss. The detection scheme for example can be used to optimize the video encoder and reduce the encoding time under the premise of negligible quality loss.

BRIEF DESCRIPTION OF FIGURES

The foregoing and further features of the present invention will be apparent from the following description of embodiments which are provided by way of example only in connection with the accompanying figures, of which:

FIG. 7 is a table showing performance evaluations of the method in FIG. 4 under different encoding configurations of VVENC.

FIG. 9 is a table showing experimental results of GAZB and PAZB detection in the method of FIG. 4 under the RA configuration, with the VVenC slow profile and 20 threads settings.

DETAILED DESCRIPTION OF PREFERRED EMBODIMENTS

Before describing exemplary embodiments of the invention, the classical AZB detection problem in video coding is revisited. In previous video coding standards, such as H.264/AVC [34] and H.265/HEVC [35], the discrete cosine transform (DCT) has been widely used to remove spatial redundancy. For better coding performance, discrete cosine transform (DST) is applied for 4×4 intra prediction residual blocks in H.265/HEVC [36]. In VVC, three transform types, including DCT-II, DCT-VIII, and DST-VII, are employed in the primary transform phase. The basis functions of DCT-II, DCT-VIII, and DST-VII can be formulated as follows, $$T_{i(j)} = \sqrt{\frac{2}{N}} \cdot \cos\left(\frac{\pi i(2j+1)}{2N}\right) \tag{1}$$

$$T_{i(j)} = \sqrt{\frac{4}{2N+1}} \cdot \cos\left(\frac{\pi(2i+1)(2j+1)}{4N+2}\right) \tag{2}$$

$$T_{i(j)} = \sqrt{\frac{4}{2N+1}} \cdot \sin\left(\frac{\pi(2i+1)(j+1)}{2N+1}\right) \tag{3}$$

Compared with DCT-II, which is suitable for smooth residual signal, DCT-VIII is more effective for decreasing residual distribution, while DST-VII excels at the residuals with an increasing trend. Thus, by combining different horizontal and vertical basis functions, the transform process can better compact the spatial energy to several coefficients. Furthermore, VVC adopts the implicit MTS [32] to improve the coding efficiency in the transform phase. Moreover, the low frequency non-separable transform (LFNST) [37] is adopted to reduce the redundancy from low-frequency transform coefficients.

Analogous to the previous standard, integer transform is used in VVC. Given M×N residual block X, horizontal and vertical transforms are applied sequentially as follows, $$T = (C_M \cdot X) \cdot C_N^T \tag{4}$$

where $C_M$ and $C_N$ are integer horizontal and vertical transform kernels, respectively. After transform, VVC adopts the TCQ with trellis graph [38], [39] to further improve the coding efficiency, including prequantization, trellis populating and backward scanning. The pre-quantization process aims to generate quantization candidates for each transform coefficient.

Figures 1A, 1B:
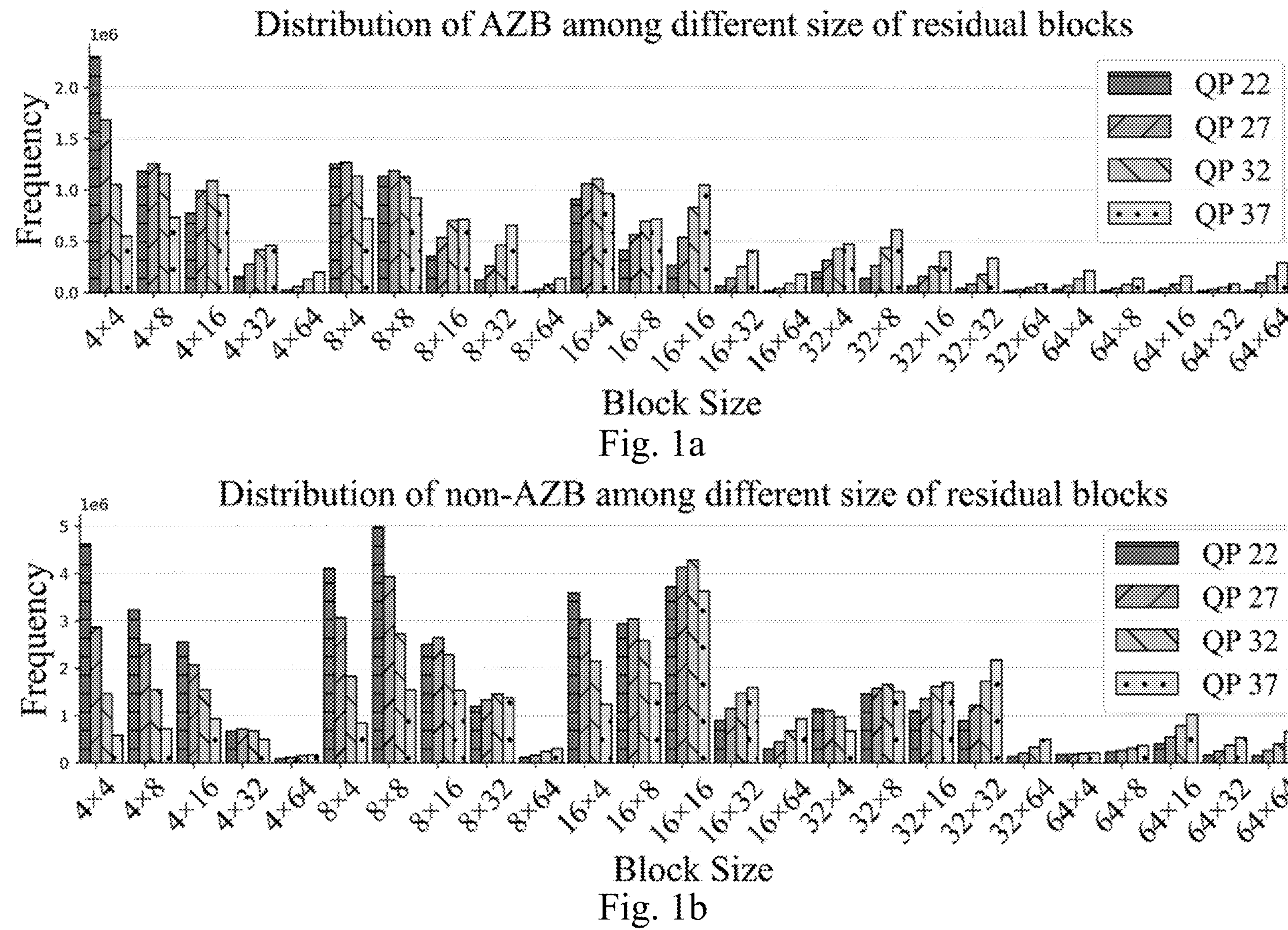
FIG. 1*a* illustrates distributions of AZB among different sizes of residual blocks for four QPs (22, 27, 32, 37).
FIG. 1*b* illustrates distributions of non-AZB among different sizes of residual blocks for four QPs (22, 27, 32, 37).
Figure 2:
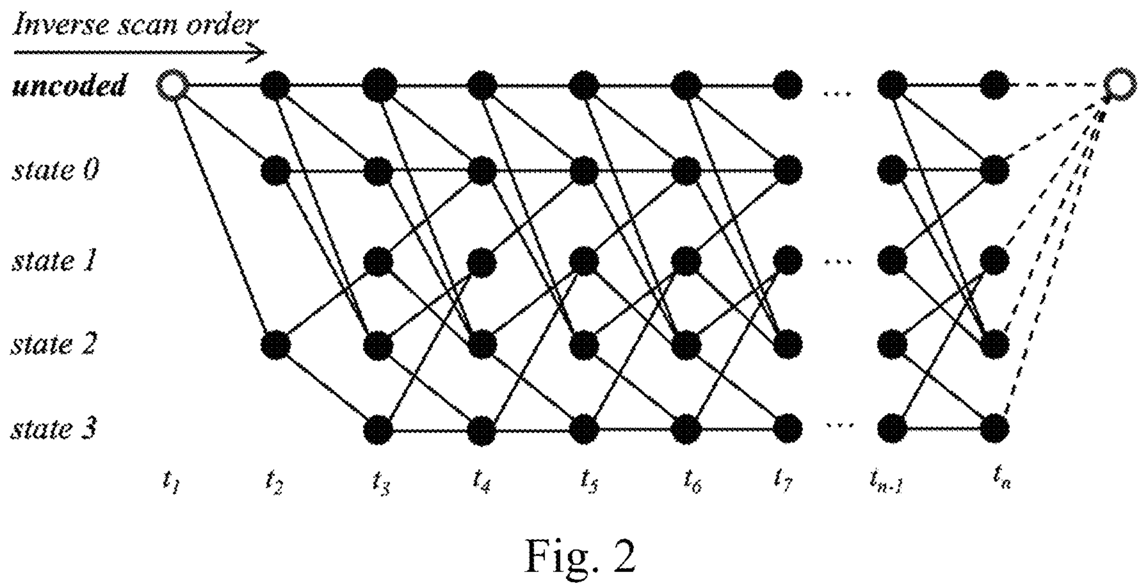
FIG. 2 illustrates an example of trellis populating for trellis-coded quantization.
Figure 3A:
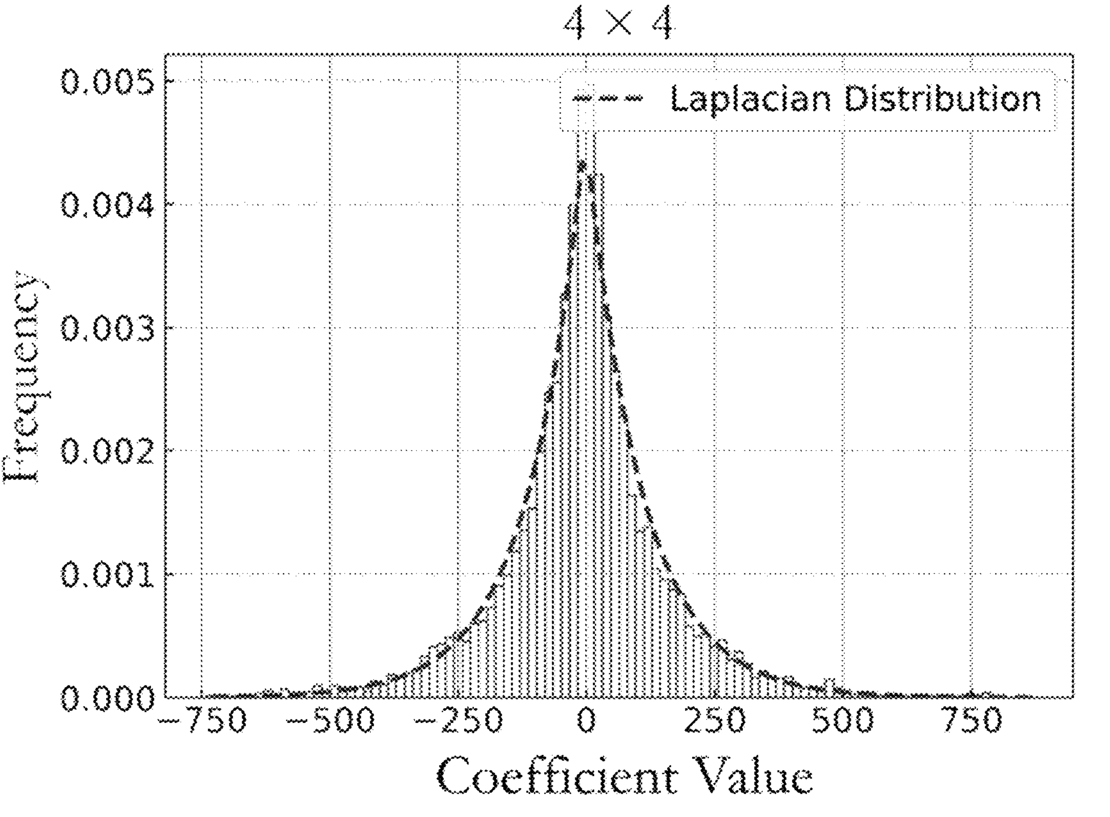
FIG. 3*a* shows distribution of residuals of a 4×4 block as approximated by the Laplacian distribution.
Figures 3B, 3C:
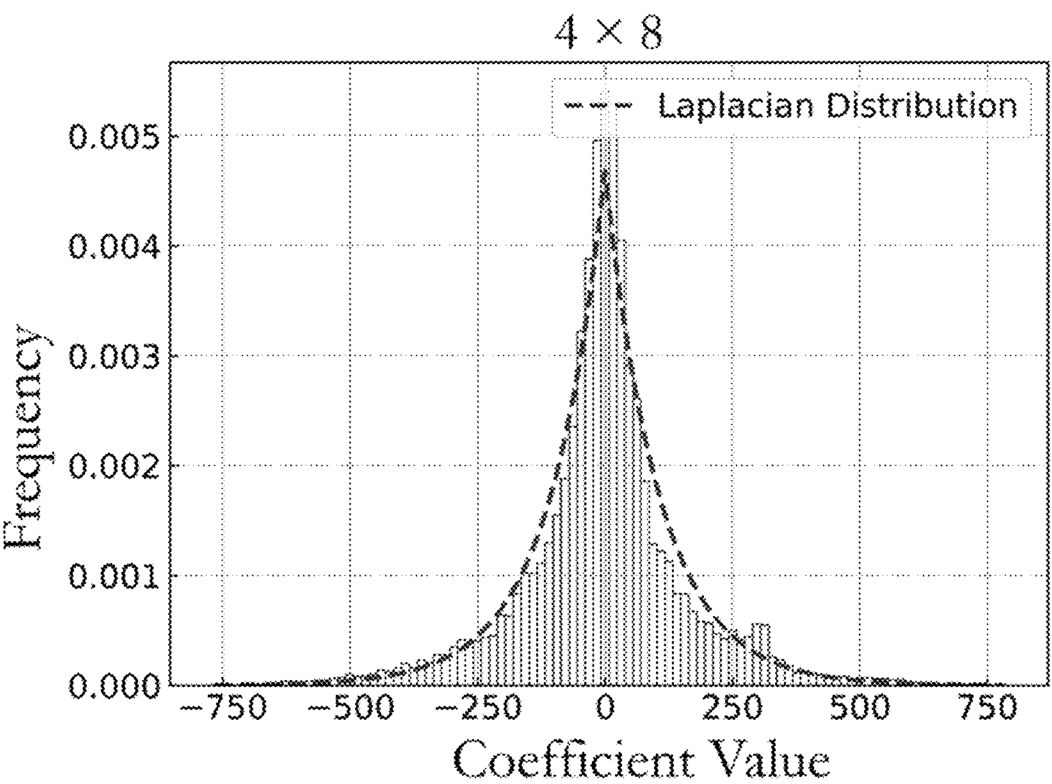
FIG. 3*b* shows distribution of residuals of a 4×8 block as approximated by the Laplacian distribution.
FIG. 3*c* shows distribution of residuals of an 8×8 block as approximated by the Laplacian distribution.
Figures 3D, 3E:
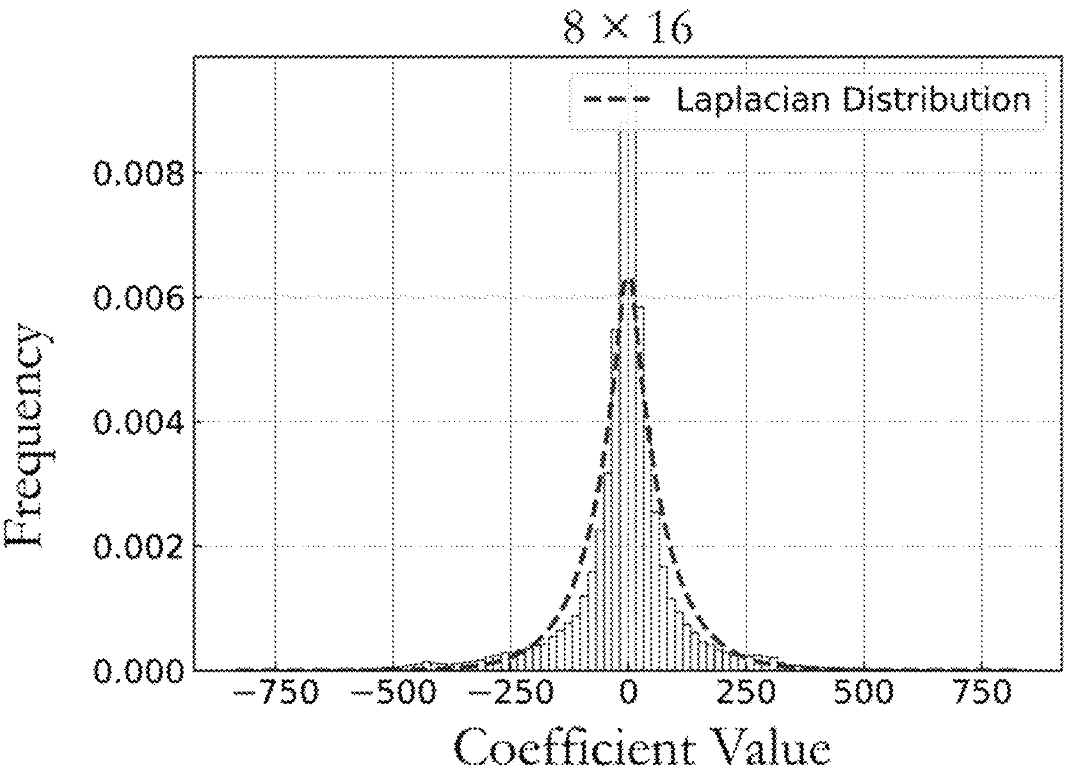
FIG. 3*d* shows distribution of residuals of an 8×16 block as approximated by the Laplacian distribution.
FIG. 3*e* shows distribution of residuals of a 16×16 block as approximated by the Laplacian distribution.
Figures 3F, 3G:
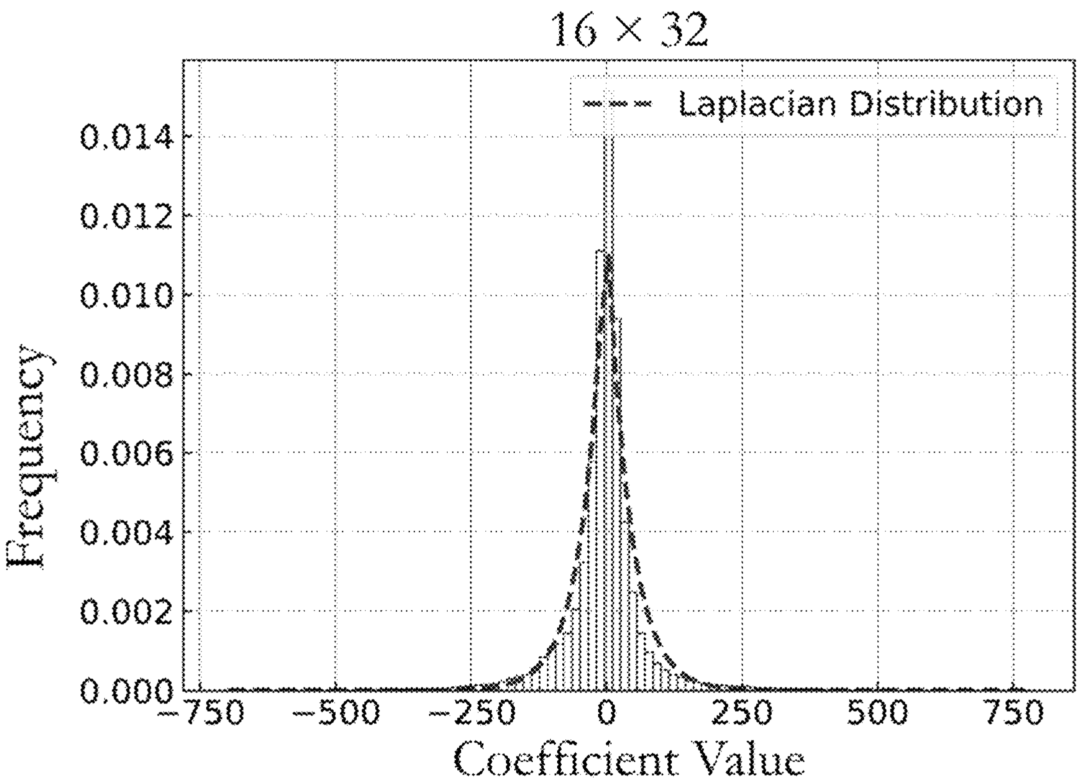
FIG. 3*f* shows distribution of residuals of a 16×32 block as approximated by the Laplacian distribution.
FIG. 3*g* shows distribution of residuals of a 32×4 block as approximated by the Laplacian distribution.
Figure 3H:
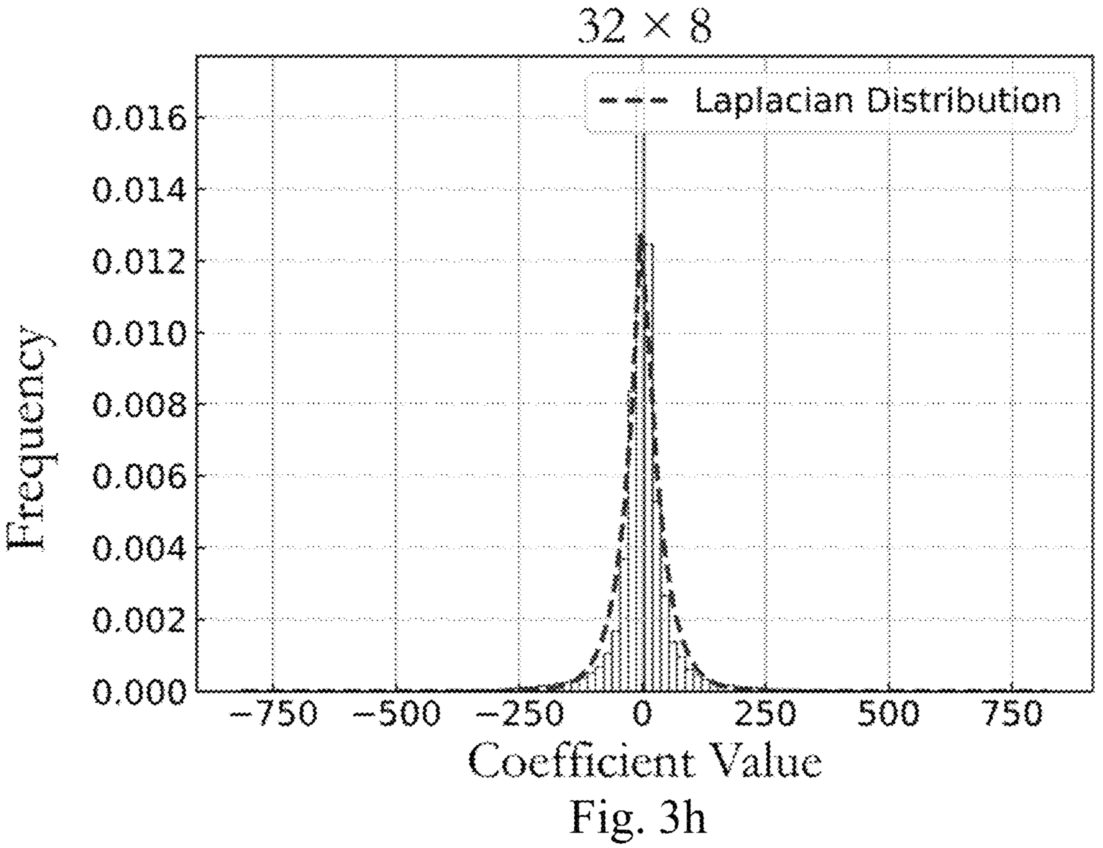
FIG. 3*h* shows distribution of residuals of a 32×8 block as approximated by the Laplacian distribution.

In the pre-quantization process, hard quantization is applied to obtain the pre-quantized index $q_k$:

$$q_k = 1/2 \cdot [1 + \text{sgn} \cdot (|t_k| \cdot M_{QP/6} + Q_{Add}) \gg Q_{shift}] \tag{5}$$

where sgn is the sign of the kth transform coefficient $t_k$. $M_{QP/6}$ is a scale parameter relative to the quotient of QP/6. $Q_{shift}$ and $Q_{Add}$ are integer quantization shift and add value, and >>represents bitwise right shift operation. Four quantized candidates for TCQ are generated based on the pre-quantization index. The quantization indices are determined during the trellis populating process. For each coefficient, the rate and distortion are calculated and recorded. As shown in FIG. 2, the RD cost is calculated for each stage and accumulated along the transition path to the next stage until the end of the block in the trellis populating phase. In FIG. 2, the trellis graph is built in an inverse scan order. Each stage in the trellis graph includes five quantization states of a transform coefficient (including a special uncoded state). The RD cost is calculated along the inverse scan order, and the path with the smallest RD cost is chosen as the final quantization solution for the current transform block. Finally, the path with the lowest cost is retained. The final phase of TCQ is backward scanning to assign the final quantized coefficient.

Figure 5:
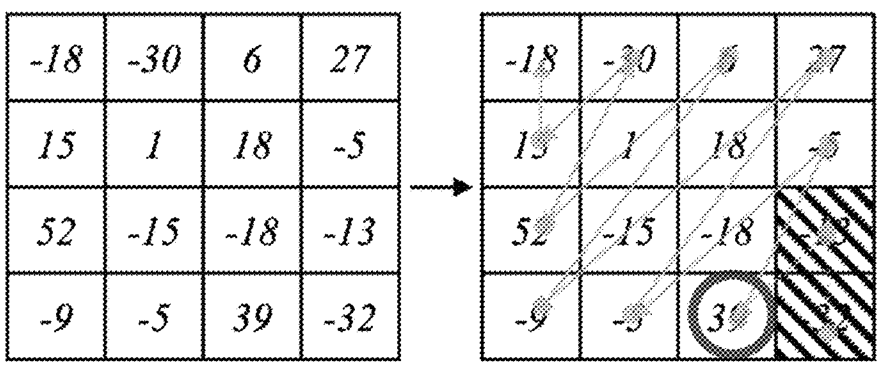
FIG. 5 is an illustration of applying the coefficient level threshold to skip insignificant coefficients and to locate the last significant coefficient.
Figures 6A, 6B:
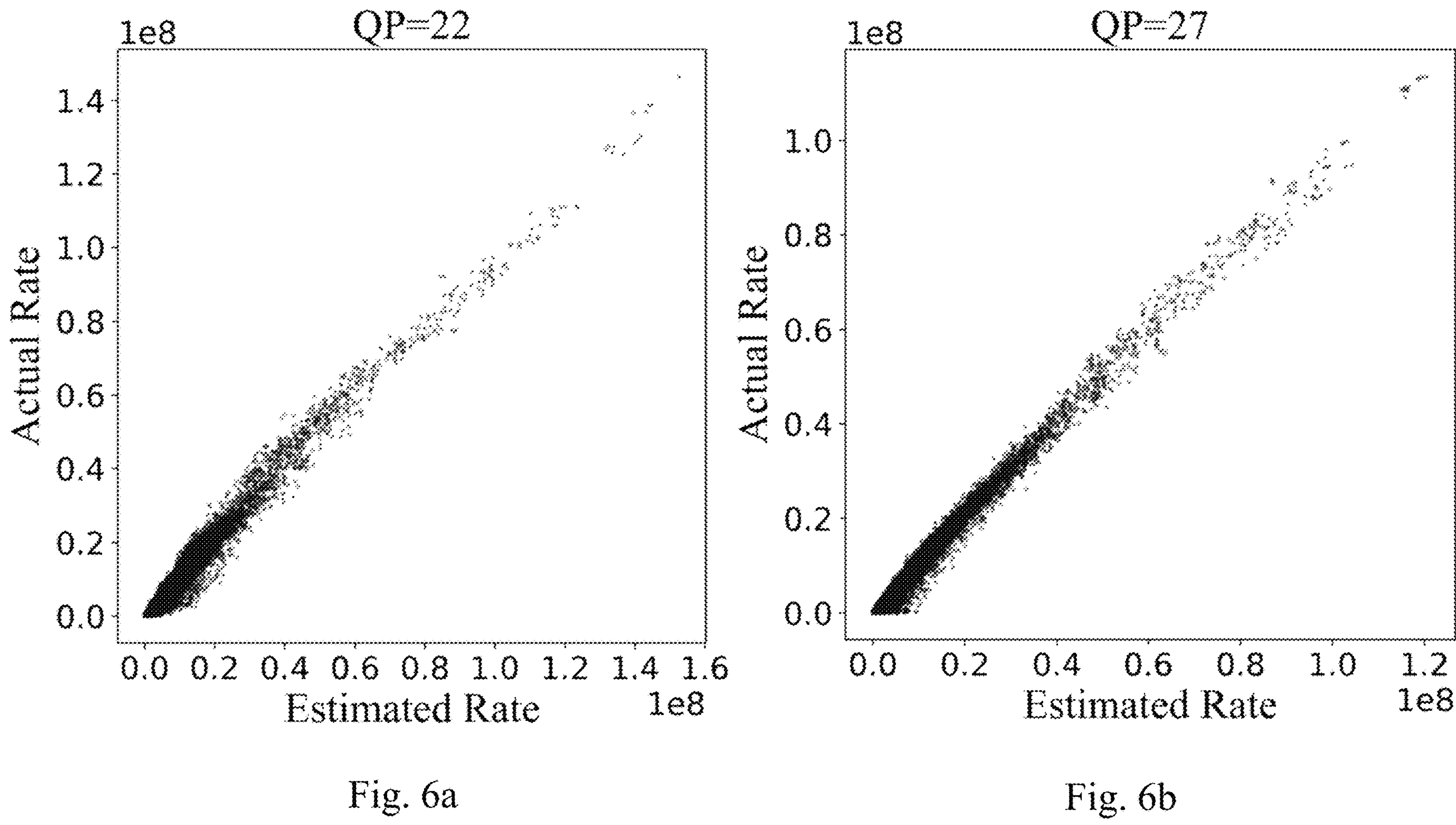
FIG. 6*a* illustrates the relationship between estimated rate and actual rate in an experiment setup for the method of FIG. 4, with QP=22.
FIG. 6*b* illustrates the relationship between estimated rate and actual rate in an experiment setup for the method of FIG. 4, with QP=27.
Figures 6C, 6D:
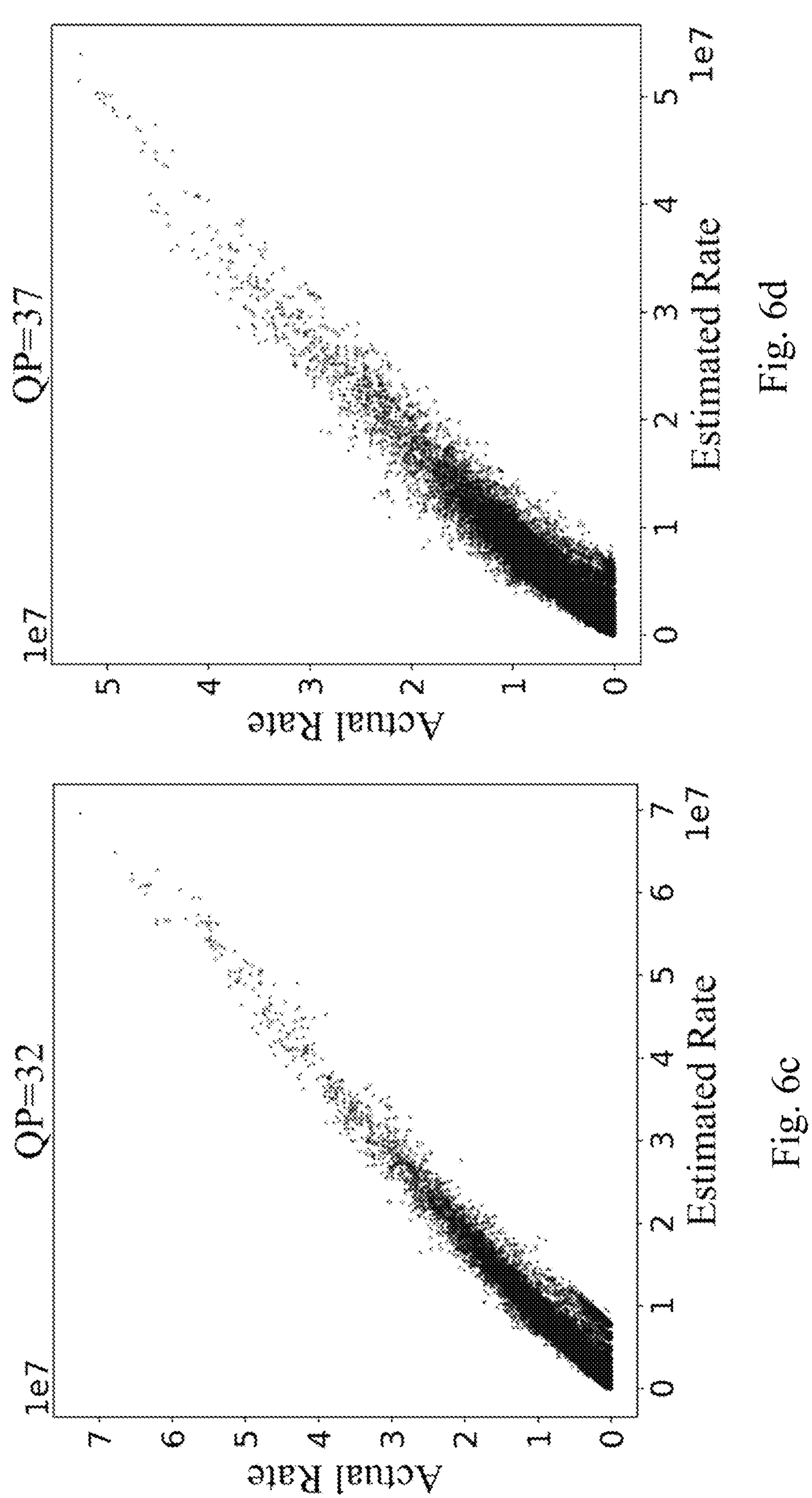
FIG. 6*c* illustrates the relationship between estimated rate and actual rate in an experiment setup for the method of FIG. 4, with QP=32.
FIG. 6*d* illustrates the relationship between estimated rate and actual rate in an experiment setup for the method of FIG. 4, with QP=37.
Figures 8A, 8B:
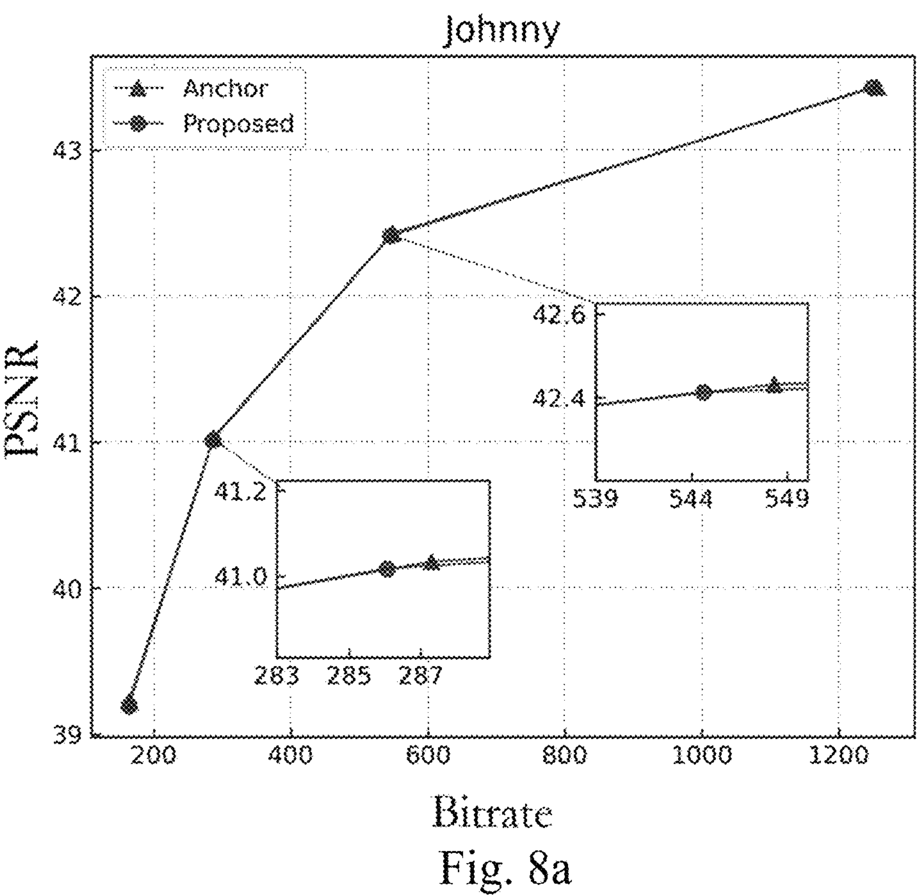
FIG. 8*a* shows the RD performance of the sequence "Johnny" for four QPs.
FIG. 8*b* shows the RD performance of the sequence "RaceHorsesC" for four QPs.
Figure 8C:
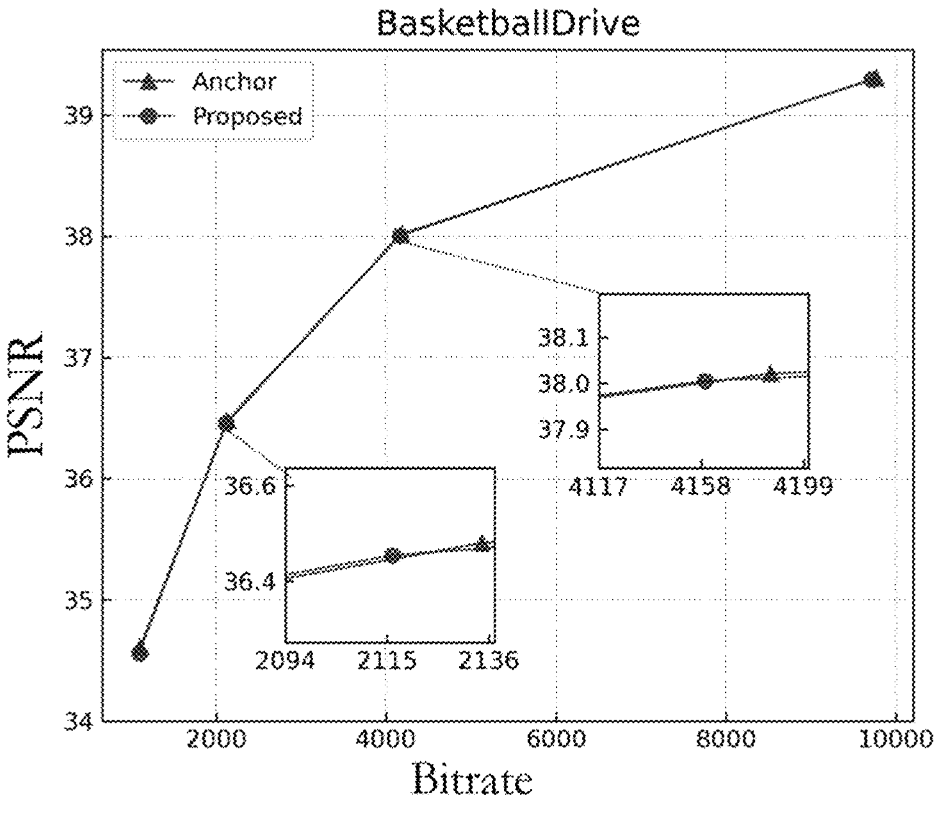
FIG. 8*c* shows the RD performance of the sequence "BaseketballDrive" for four QPs.
Figure 8D:
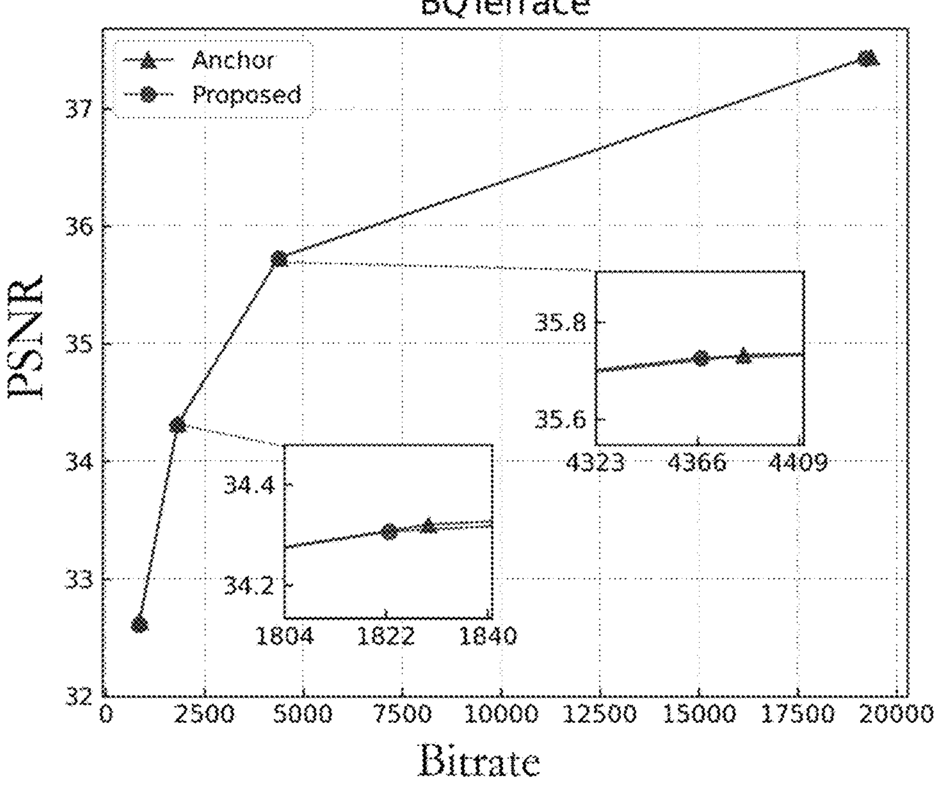
FIG. 8*d* shows the RD performance of the sequence "BQTerrace" for four QPs.
Figures 8E, 8F:
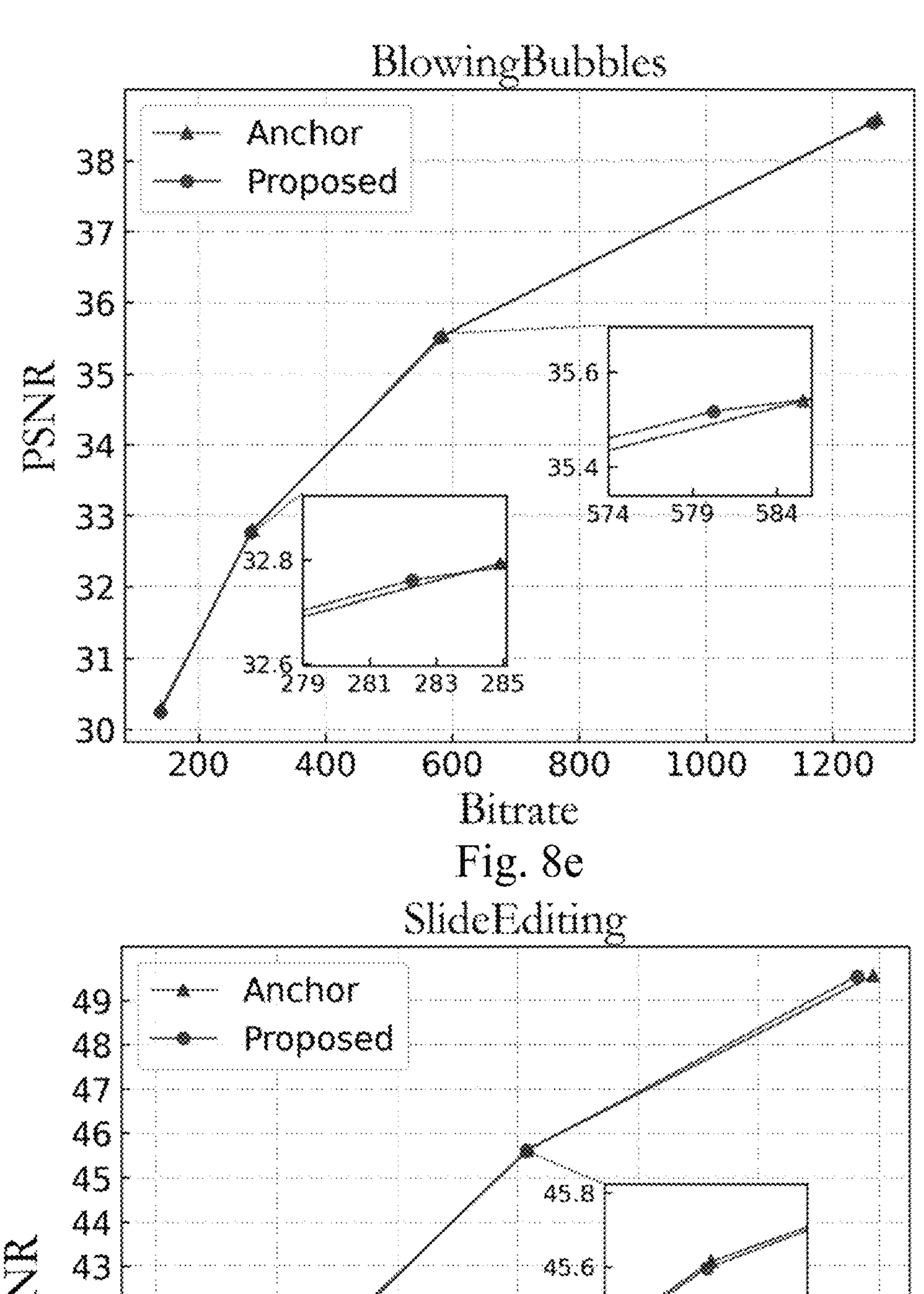
FIG. 8*e* shows the RD performance of the sequence "BlowingBubbles" for four QPs.
FIG. 8*f* shows the RD performance of the sequence "SlideEditing" for four QPs.
Figures 8G, 8H:
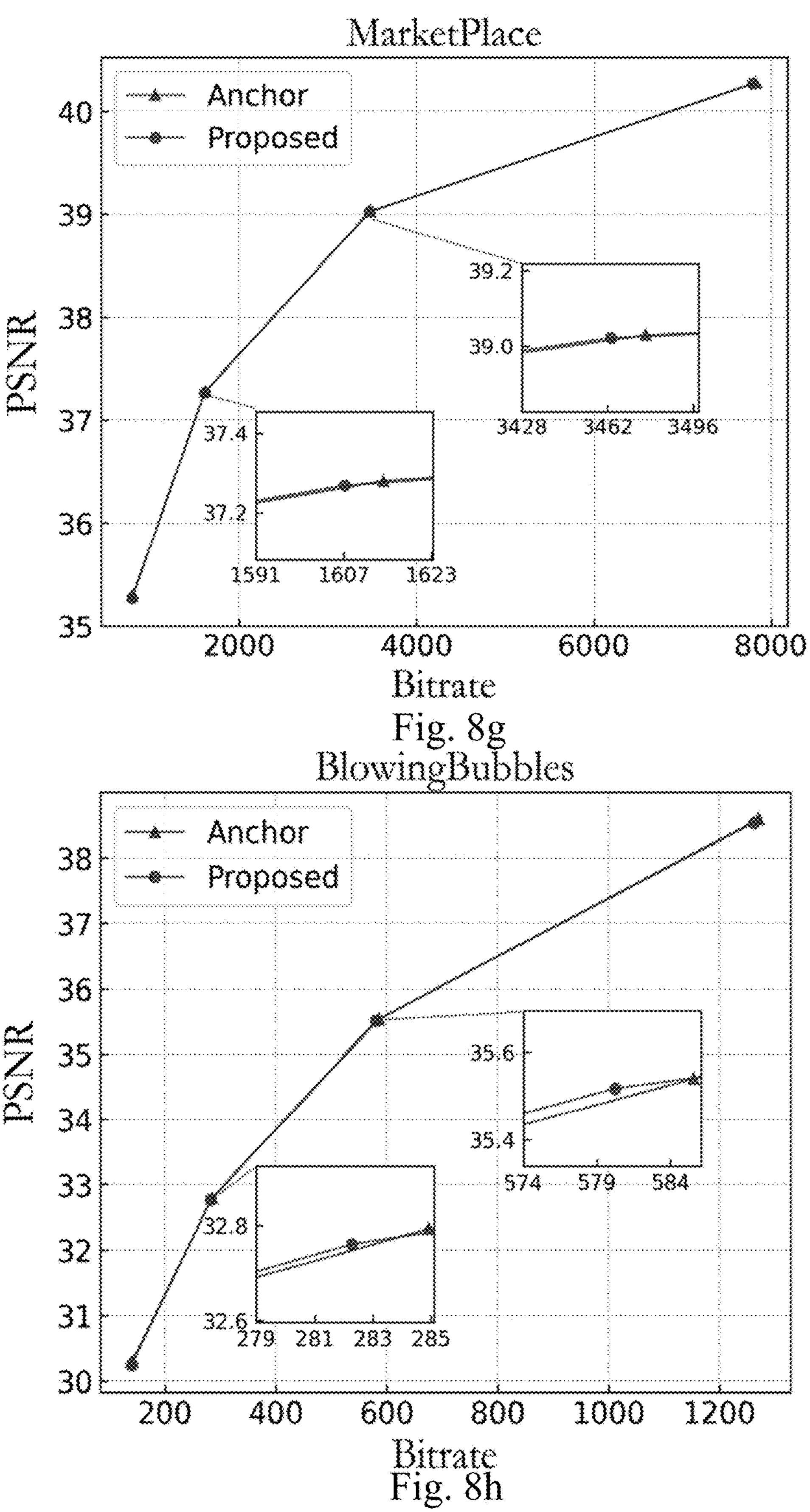
FIG. 8*g* shows the RD performance of the sequence "MarketPlace" for four QPs.
FIG. 8*h* shows the RD performance of the sequence "BlowingBubbles" for four QPs.

Since the trellis populating process is state-dependent which cannot be implemented in parallel, TCQ significantly increases the computational complexity during encoding. In FIG. 2, each coefficient represents a stage in the trellis graph, corresponding to the overall complexity of TCQ. In practice, it is necessary to skip insignificant coefficients in a transform block before TCQ, as shown in FIG. 5.

There are different AZB early detection techniques introduced in previous literatures for H.264/AVC and H.265/HEVC. For H.265/HEVC, larger transform block sizes, such as 16×16 and 32×32, are supported. Compared with H.264/AVC, each transform block in H.265/HEVC exhibits more diverse content characteristics. Additionally, the introduction of RDOQ in H.265/HEVC brings a new type of zero block during encoding, which is the PAZB. Compared with GAZB, which is obtained from hard quantization, PAZB is determined through the RDOQ process, in particular when the RD cost of AZB is lower than the non-zero case. The difference between AZB detection in VVC and previous standards lies in the unique encoding features introduced in VVC. For example, VVC introduces the MTT partitioning scheme for better adaptation to the various video content [41]. For MTT partition, the binary tree (BT) and ternary tree (TT) partition scheme can better adapt some video contents, introducing diverse residual blocks and additional computational complexity. Previous AZB research only investigated the square block mathematical derivation since the macroblock is applied in a square partition style, which cannot be directly applied in the current standard. In addition to the variation in block size, VVC introduces MTS to extend the transform efficiency by defining four additional combinations of separate DST and DCT kernels for both square and non-square luma block sizes ranging from 4×4 to 32×32. Furthermore, TCQ in VVC alters the quantization approach from scalar to vector by seeking the optimal path [33]. Consequently, it's clear that simply applying existing methods to VVC won't suffice, and a new AZB detection method for VVC is urgently needed.

Figure 4:
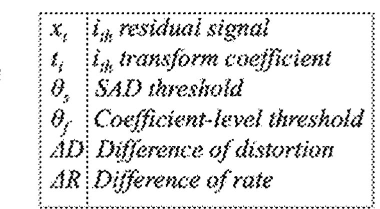
FIG. 4 illustrates the overall process of an AZB detection method according to an embodiment of the invention, in which spatial residual domain GAZB, frequency domain GAZB, and PAZB are detected in different stages.

Referring to FIG. 4, next the descriptions will go to an exemplary embodiment of the invention, in which there is provided an AZB detection method (also referred to as "proposed method" in the following descriptions for this method in this particular embodiment) for video coding that is redesigned for better performance as compared to conventional methods, in view of the unique coding tools adopted in VVC. In particular, the pre-quantization process in the graph-based dependent quantization and variable transform sizes, are exploited in a scientifically-sound way for the inference of AZB. Validations have demonstrated the promise of the proposed method. Moreover, the proposed method also lays solid foundations for the optimization of future video coding standards beyond VVC.

As shown in FIG. 4, in the proposed method spatial residual domain GAZB, frequency domain GAZB, and PAZB are detected in different stages. The first condition is that the SAD of the current residual signal is smaller than a pre-calculated threshold $\theta_s$. This second condition is all transform coefficients are smaller than a coefficient-level threshold $\theta_f$. The third condition is to check the difference of distortion ΔD and the difference of rate ΔR from the remaining coefficients.

The development of the proposed method with the collaboration of GAZB and PAZB detection tailored for VVC will be then discussed. Experimental results show that the proposed method could bring significant encoding time savings with negligible rate-distortion loss. The GAZB detection method considers the variable transform sizes in VVC. In particular, the residual distributions under different transform sizes are modeled to establish the relationship between AZB and the sum of absolute residuals. On the other hand, the PAZB detection method considers the trellis graph-based path search in VVC. In particular, the rate-distortion cost, as well as the number of significant coefficients, are employed for PAZB detection.

Next, a systematic analysis of the spatial domain residual signal will be discussed. Based on mathematical derivation, a theoretical upper bound is obtained for detecting non-square GAZB. For undetected cases, the last significant coefficient is located after before TCQ for each transform block. A PAZB detection model is further established afterward to accommodate the different transform sizes and TCQ in VVC. Finally, the overall AZB detection scheme will be presented.

Based on the assumption that the residual signals follow certain distributions (e.g., Laplacian, Gaussian, or Generalized Gaussian), prior research works [31], [40] derive SAD or SATD based thresholds for N×N square blocks by establishing a relationship between standard deviation $\sigma_{th}$ of transform coefficients and standard deviation $\sigma_{resi}$ for residual values. In VVC, the separable transform is used, and the width and height dimensions are not necessarily identical. As such, it is not straightforward to apply existing methods. In this subsection, the GAZB model is derived from deriving the SAD upper bound $\theta_s$ for early detecting M×N residual blocks. The following derivation is also applicable for square blocks as N×N residual block is a special case in the following derivation.

To facilitate the mathematical derivation, a theoretical coefficient upper bound $\theta_f$ in the frequency domain is deduced first. If a transform block is quantized to an AZB, the TCQ pre-quantization index $q_k$ in Eqn. (5) should satisfy, $$|q_k| < \delta, \tag{6}$$

where δ is an empirical positive real number. After combining the formulation of $q_k$ in Eqn. (5) and the inequality Eqn. (6), one will obtain $$|t_k| < \frac{(2\delta - 1) \cdot 2^{Q_{shift}} - Q_{add}}{M_{QP/6}}. \tag{7}$$

From Eqn. (7), a coefficient upper bound $t_k < \theta_f$ is obtained. In practical implementation, $Q_{shift}$ is set as 13+QP/6, and $Q_{Add}$ is $2^{Qshift-1}$. After simplification of the previous inequality and converting the base two power function to bit wise left shift operation, $\theta_f$ is formulated as $$\theta_f = \frac{\left(2\delta - \frac{3}{2}\right) \ll \left(13 + \frac{QP}{6}\right)}{M_{QP/6}}. \tag{8}$$

The relationship between the residual value and the transform coefficient should be further explored before extending the coefficient upper bound into the spatial residual domain threshold. Herein, the distribution of residual signals for both square and non-square residual blocks is first validated. As shown in FIGS. 3*a*-3*h*, the distribution of the residual value can be approximated by the Laplacian distribution. More specifically, the probability density function of a zero-mean Laplacian distribution can be formulated as $$p(x) = \frac{1}{2b} e^{-\frac{|x|}{b}}, \tag{9}$$

where b is a scale parameter, and the standard deviation is formulated as $$\sigma_{resi} = \sqrt{2}\, b. \tag{10}$$

The mathematical expectation of the absolute residuals x is given by $$E[|x|] = \int_{-\infty}^{\infty} |x| \frac{1}{2b} e^{-\frac{|x|}{b}} = b. \tag{11}$$

By combining Eqn. (11) and Eqn. (10), one will obtain $$\sigma_{resi} = \sqrt{2}\, E[|x|]. \tag{12}$$

In Eqn. (12), the mathematical expectation E[|x|] can also be approximated as the mean absolute difference of current M×N block:

$$E[|x|] \approx \frac{SAD}{M \times N}. \tag{13}$$

With Eqn. (13) and Eqn. (12), the standard deviation of residual values $\sigma_{resi}$ can be formulated as $$\sigma_{resi} = \frac{\sqrt{2}\, SAD}{M \times N}. \tag{14}$$

To build the relationship between residual standard deviation $\sigma_{resi}$ and standard deviation of transform coefficients $\sigma_{tr}$, a more detailed analysis is conducted. According to [42], if $R_M$ and $R_N$ denote the covariance matrices of M×M and N×N vectors, the corresponding quantities $R_M$ and $R_N$ after $$R'_M = C_M R_M C_M^T, \tag{15}$$

$$R'_N = C_N R_N C_N^T, \tag{16}$$

where $C_M$ and $C_N$ denote horizontal and vertical transform kernels. $R_M$ and $R_N$ are relevance matrices defined as $$R_M = \begin{bmatrix} 1 & \cdots & \rho^{M-1} \\ \vdots & \ddots & \vdots \\ \rho^{M-1} & \cdots & 1 \end{bmatrix} \tag{17}$$

$$R_N = \begin{bmatrix} 1 & \cdots & \rho^{N-1} \\ \vdots & \ddots & \vdots \\ \rho^{N-1} & \cdots & 1 \end{bmatrix} \tag{18}$$

in which ρ is the relevance value, and set as 0.6 according to the experimental analysis in [21], [31], [40], [42]. For an N×N residual block, the standard deviation of the $(u, v)_{th}$ coefficient $\sigma_{tr}(u, v)$ can be represented as $$\sigma_{tr}^2(u, v) = \sigma_{resi}^2 \cdot \frac{m[R'_N]_{(u,u)}[R'_N]_{(v,v)}]}{N^2}. \tag{19}$$

where $[R'_N']_{(u,u)}$ represents the $(u, u)_{th}$ element in matrix $[R'_N]$. m is a scaled factor to accommodate the integer transform process. For M×N residual block with potentially different horizontal and vertical transform kernels, $\sigma^2(u, v)$ can be approximated as, $$\sigma_{tr}^2(u,v) \approx \sigma_{resi}^2 \cdot \frac{m[R'_M]_{(u,u)}[R'_N]_{(v,v)}]}{M \times N}. \quad (20)$$

By combining Eqn. (20) and Eqn. (14), one will obtain $$\sigma_{tr}(u,v) = \text{SAD} \cdot \frac{m\sqrt{2[R'_M]_{(u,u)}[R'_N]_{(v,v)}]}}{(M \times N)^{3/2}}. \quad (21)$$

According to the probability theory, 99.73% of the transform coefficient $t_k$ satisfy $t_k < 3\sigma_{tr}$. After combining Eqn. (21) and Eqn. (8), one will obtain $$\text{SAD} \cdot \frac{m\sqrt{2[R'_M]_{(u,u)}[R'_N]_{(v,v)}]}}{(M \times N)^{3/2}} < \frac{\theta_f}{3}. \quad (22)$$

With Eqn. (21) and Eqn. (22), the SAD upper bound $\theta_s$ is derived as follows, $$\theta_s = \theta_f \cdot \frac{(M \times N)^{3/2}}{3m\sqrt{2\phi}} \quad (23)$$

where $\phi$ is the maximum item in matrix [R'](u,u) [R'](v,v), and $\theta_f$ is given in Eqn. (8). $\theta_s$ can be applied in the spatial residual domain for early determination of zero coefficient to save both transform and quantization encoding time. Furthermore, to better incorporate the coefficient upper bound with the TCQ process, $\theta_f$ is applied to determine the last significant coefficient $t_L$ in a transform block. Specifically, if $\theta_f$ fails to detect GAZB in the spatial residual domain, $\theta_f$ is compared with each transform coefficient in inverse scan order for locating the last significant coefficient $t_L$. According to FIG. 5, following the scanning order, the absolute value of each coefficient $t_k$ is compared with $\theta_f$. Therefore, if no $t_L$ is found during this process, the transform block can be early determined as a frequency domain GAZB, and the following quantization process is skipped. Otherwise, a trellis graph is built starting from the last significant coefficient to the top-left coefficient. Since both $\theta_s$ and $\theta_f$ are only determined by the dimension, QP, and the transform type, the values are calculated prior to the encoding and stored as a look-up table to avoid repetitive computation.

In FIG. 5, the last significant coefficient is shown by the solid-line circle. In this example, the coefficient level threshold is set to 35, and the shaded coefficients are early determined as reconstructed zero-value coefficients. The transform block is determined as AZB if all coefficients are insignificant.

As mentioned above, a coefficient-level threshold is applied to locate the last significant coefficient $t_L$. When building a trellis graph for TCQ, determining the last significant coefficient reduces the number of stages and the overall complexity of TCQ. However, in some cases, the block is determined as an AZB after the trellis graph is built, and such blocks are treated as PAZB caused by TCQ. To detect the PAZB introduced by the TCQ, a PAZB detection method is proposed which will now be described in detail.

The RD relationship governs the classification of PAZB and non-AZB. In TCQ, a path with the smallest RD cost is chosen after the trellis populating stage. For PAZB, the smallest cost occurs when all indices are quantized to zeros. According to the principle of RD optimization, one have the following inequality, $$J_{PAZB} < J_{non-AZB}, \quad (24)$$

where $J_{P\ AZB}$ and $J_{non-AZB}$ are the RD costs of PAZB and non-AZB, respectively. Both $J_{P\ AZB}$ and $J_{non-AZB}$ contain D term and R term, $$D_{PAZB} + \lambda R_{PAZB} < D_{non-AZB} + \lambda R_{non-AZB}. \quad (25)$$

After combining the D term and R term:

$$D_{PAZB} - D_{non-AZB} < +\lambda(R_{non-AZB} - R_{PAZB}). \quad (26)$$

One further have $$\Delta D < \lambda \cdot \Delta R. \quad (27)$$

For the distortion term, $D_{PAZB}$ can be formulated as, $$D_{PAZB} = \sum_{k=0}^{M \times N-1} (t_k - \hat{t}_k)^2 = \sum_{k=0}^{L-1} t_k^2 + \sum_{k=L}^{M \times N-1} t_k^2, \quad (28)$$

where n is a scaling factor accounting for the relationship between transform-domain distortion and spatial-domain distortion for integer transforms. $t_k$ and $\hat{t}_k$ are the original transform coefficient and the reconstructed transform coefficient, respectively. The reconstructed value $t_k$ is always zero for AZB. L is the position of the last significant coefficient $t_L$ determined by Eqn. (8). For distortion of non-AZB $D_{non-AZB}$, the distortion of each transform coefficient can be estimated individually. More specifically, according to Eqn. (5), when coefficient $t_k$ is quantized to $q_k$, lower $Q_{shift}$ bits of $(t_k \cdot M_{QP/6} + Q_{add})$ will be discarded permanently by the right shift operation, causing inevitable distortions. In particular, the distortion can be measured as $$(t_k \cdot M_{QP/6} + Q_{add})\ \&((1 << Q_{shift}) - 1), \quad (29)$$

where "&" is the bitwise AND operator.

For rate estimation, the linear relationship in [6] is adopted, $$\Delta R = \alpha l_0 + \beta l_1 + \gamma R_L + \epsilon \quad (30)$$

where $l_0$ and $l_1$ represent $l_0$-norm and $l_1$-norm after pre-quantization process. $R_L$ is the number of bits for encoding the position of the last significant coefficient. The parameters $\alpha$, $\beta$ and $\gamma$ are model parameters. The linear regression model is used to determine the model parameters, and experimental results in FIG. 6*a*-6*d* further validate the accuracy of the model in VVC.

The overall process of the proposed method for AZB detection is now described. As shown in FIG. 4, the proposed method integrates GAZB and PAZB. In the first stage, the spatial residual domain GAZB detection is achieved by applying the SAD threshold $\theta_s$. For these GAZB, the transform, inverse transform, quantization, dequantization process, and residual entropy coding process are all skipped. Subsequently, the frequency domain GAZB detection using the coefficient-level threshold $\theta_f$ is applied to further improve the detection accuracy. If all coefficients in the current transform block are smaller than $\theta_f$, the current transform block is detected as frequency domain GAZB, such that the following quantization and dequantization process is skipped. Otherwise, the last significant coefficient $t_L$ in the transform block is identified, and those coefficients that are before $t_L$ in the inverse scan order are set as zeros. For the remaining coefficients, the proposed PAZB detection technique is adopted to further predict potential AZB. In this phase, RD estimation is incorporated to differentiate between PAZB and non-AZB. Moreover, for the potential PAZB, the ratio of large coefficients that are higher than $\theta_f$ is further calculated. If this ratio is larger than the predetermined threshold, it is set as the non-AZB again. By combining GAZB and PAZB, the proposed method achieves reliable AZB detection.

Next, the descriptions go to discussions of extensive experiments with test sequences from the common test conditions in VVC. In particular, the proposed method is implemented in VVenC [43], which is an optimized implementation of the VVC encoder. Compared with the VVC test model VTM, VVenC can approach VVC's efficiency at only 46% of the runtime of VTM at single-thread mode and can be further accelerated with a faster profile. The SAD values of residual blocks are obtained before the transform phase, and SIMD is used to optimize the implementation of SAD calculation to reduce the computational overhead. The SAD upper bound $\theta_s$ and coefficient-level upper bound $\theta_t$ are pre-calculated and stored as a look-up table, which can be indexed by the current QP, horizontal and vertical transform type and dimension of the current block. The empirical value $\delta$ in Eqn. (8) is determined by a grid search experiment. 1.375 is adopted in the experiment as it provides the best tradeoff between time-saving and encoding loss. Three encoding configurations, including random access (RA), low delay (LD), and all intra (AI), are tested. The results from the proposed method are compared with the anchor VVenC 1.7.0, and the coding complexity and coding performance of the proposed method are evaluated, including Bjøontegaard delta bit rate (BD-rate), transform time saving $TS_T$, quantization time saving $TS_Q$ and total encoding time saving $TS_{total}$. More specifically, $TS_T$, $TS_Q$ and $TS_{total}$ are calculated as follows, $$TS_T = \frac{T_T - T_T'}{T_T} \times 100\%, \tag{31}$$

$$TS_Q = \frac{T_Q - T_Q'}{T_Q} \times 100\%, \tag{32}$$

$$TS_{total} = \frac{T_{total} - T_{total}'}{T_{total}} \times 100\%, \tag{33}$$

where $T_T$, $T_Q$, $T_{total}$ are transform, quantization, and total encoding time of the anchor, and $T'_T$, $T'_Q$, $T'_{total}$ are corresponding time of VVenC with the proposed method. More specifically, to obtain $T_T$ and $T'_T$, both forward transform and inverse transform are considered. Analogously, for $T_Q$, $T'_Q$, both quantization and dequantization are considered. The processing speed in terms of fps is calculated as the total frame divided by the total encoding time. The average fps of 4 QPs is shown for each sequence and class total. The proposed method is implemented on VVEnC 1.7.0, and the experiments are conducted at slow profile with 20 threads setting. All the tests were sequentially conducted on an Intel Xeon CPU E5-2670 v2 2.50 GHz processor on an Ubuntu 18.04.6 server.

The performance of the proposed method is shown in the Table I of FIG. 7. The results demonstrate that the proposed method significantly reduces the time for transform and quantization, leading to the reduction in the total complexity of the encoding. More specifically, under the RA configuration, an average of 3.83% time saving is achieved with 0.3% BD-rate loss. The degradation is smaller in low-resolution sequences, such as sequences in class C and D, with only 0.28% and 0.25% BD-rate degradation, respectively. The RD performance is further shown in FIGS. 8*a*-8*h*. It is interesting to observe that the overall bitrate can be reduced with limited quality loss. Under the LD configuration, the transform and quantization time savings are more apparent. The time savings in AI configuration is also shown, and the $TS_T$, $TS_Q$, and $TS_{total}$ are around 5%. The proposed method can achieve consistent time savings with ignorable RD performance loss under different configurations. In terms of encoding speed, over 1080p sequences, the optimized encoder achieves an average of 0.1886 fps, 0.0741 fps, and 0.0523 fps under RA, LD and AI configuration, respectively.

Next, the performance of GAZB and PAZB detection are presented in Table II in FIG. 9. First the performance of GAZB detection is evaluated. Since the coefficient level threshold $\theta_f$ is implemented in the frequency domain to skip quantization, it mainly contributes to the quantization time saving. After combining $\theta_f$ with the spatial residual domain threshold $\theta_s$, one can see a significant improvement in transform time saving. According to the experimental results in Table II, applying GAZB achieves a transform time savings of approximately 5.73% and quantization time savings of roughly 7.82%. The average loss of BD-rate observed for GAZB is 0.2%, which is negligible compared to the transform and quantization time savings, indicating that the GAZB detection is capable of reducing the complexity of transform and quantization without compromising the RD performance. The performance of PAZB detection in the frequency domain is then demonstrated. According to the experimental results in Table II, one can observe the reduction in quantization time by only applying PAZB detection. The average time saving in quantization is 2.49%, and the total encoding time saving is 0.56%. These results further validate the effectiveness and efficiency of the proposed method in accurately detecting AZB, leading to economized encoding complexity.

Next, the detection accuracy of the proposed AZB detection method is presented. As the proposed AZB detection model aims at binary classification, the prediction result is positive when the current block is detected as AZB (GAZB or PAZB). The ground truth is positive for true AZB. Therefore, one can obtain the total number of true positive predictions (TP), true negative predictions (TN), false positive predictions (FP), and false negative predictions (FN) of the proposed method. The false negative ratio (FNR) and false positive ratio (FPR) are further utilized to analyze the performance. Herein, FNR represents the proportion of undetected AZB out of all true AZB, and FPR represents the proportion of false detection among all non-AZB, $$FNR = \frac{FN}{FN + TP} \times 100\%, \quad (34)$$

$$FPR = \frac{FP}{FP + TN} \times 100\%. \quad (35)$$

TABLE III

ILLUSTRATIONS OF THE FALSE NEGATIVE RATIO FOR BASKETBALLDRIVE UNDER THE RA CONFIGURATION.

| | Total | FNR | | | |
|---|---|---|---|---|---|
| Size | AZB | QP 22 | QP 27 | QP 32 | QP 37 |
| 4 × 4 | 17,242,872 | 2.12% | 1.38% | 1.21% | 1.34% |
| 4 × 8 | 10,495,855 | 4.40% | 2.45% | 2.04% | 1.93% |
| 4 × 16 | 10,320,165 | 6.19% | 3.37% | 2.65% | 2.24% |
| 4 × 32 | 2,966,854 | 7.04% | 5.05% | 3.88% | 3.02% |
| 4 × 64 | 847,115 | 10.14% | 8.33% | 5.53% | 4.11% |
| 8 × 4 | 10,849,031 | 3.77% | 1.72% | 1.47% | 1.53% |
| 8 × 8 | 13,654,812 | 5.85% | 2.86% | 2.46% | 2.36% |
| 8 × 16 | 5,901,701 | 8.66% | 4.84% | 4.19% | 3.80% |
| 8 × 32 | 3,396,066 | 12.03% | 7.85% | 5.57% | 4.29% |
| 8 × 64 | 542,992 | 8.86% | 8.99% | 8.09% | 5.77% |
| 16 × 4 | 11,048,683 | 5.19% | 2.50% | 2.11% | 2.11% |
| 16 × 8 | 6,136,303 | 7.63% | 4.18% | 3.72% | 3.45% |
| 16 × 16 | 6,340,749 | 10.52% | 5.97% | 4.18% | 3.77% |
| 16 × 32 | 2,012,411 | 12.70% | 7.31% | 6.28% | 4.67% |
| 16 × 64 | 651,547 | 12.67% | 10.61% | 10.27% | 8.42% |
| 32 × 4 | 3,258,864 | 6.32% | 3.78% | 3.03% | 2.68% |
| 32 × 8 | 3,331,254 | 10.67% | 6.69% | 4.73% | 4.09% |
| 32 × 16 | 2,003,083 | 12.50% | 6.49% | 5.63% | 4.56% |
| 32 × 32 | 1,323,885 | 19.30% | 11.70% | 8.67% | 7.30% |
| 32 × 64 | 419,530 | 14.40% | 7.55% | 8.48% | 10.18% |
| 64 × 4 | 917,136 | 9.94% | 6.58% | 4.59% | 4.08% |
| 64 × 8 | 584,734 | 12.01% | 7.38% | 6.11% | 5.36% |
| 64 × 16 | 610,314 | 17.81% | 11.45% | 8.48% | 7.85% |
| 64 × 32 | 409,653 | 19.67% | 10.25% | 8.18% | 8.10% |
| 64 × 64 | 1,048,183 | 11.38% | 5.83% | 3.80% | 3.72% |

The experiments as shown in Table III and Table IV are conducted on the first 100 frames of BasketballDrive sequence under RA configuration. Different sizes of transform blocks are considered separately, ranging from 4×4 to 64×64. According to the FNR results shown in Table III, one can see the proposed method achieves high detection accuracy. On average, the FNR is less than 10%, indicating that the proposed method can detect most of the AZB. In particular, the detection accuracy is higher for small blocks. More than 17 millions of 4×4 blocks are all-zero blocks after dequantization, and the corresponding FNR varies from 2.12% at QP=22 to 1.34% at QP=37. Since the content is more diverse when the size of a block increases, the FNR for larger blocks (e.g., 32×32 and 64×64) is relatively higher than for small blocks. For 64×64 blocks, the FNR achieves 3.72% when QP=37 and increases to 11.38% when QP=22. On the other hand, a larger FPR represents more false predictions. As shown in Table IV, the proposed method exhibits a low FPR rate among all sizes of blocks. According to Table IV, for 4×4 blocks, the FPR varies from 2.76% for QP=22 to 3.86% for QP=37. For larger blocks, the average FNR remains below 1% for 32×32 block and less than 0.1% for 64×64 block. The results demonstrate the robustness of the proposed method and ensure a reasonable acceleration performance with ignorable RD loss.

TABLE IV

ILLUSTRATIONS OF THE FALSE POSITIVE RATIO FOR BASKETBALLDRIVE UNDER THE RA CONFIGURATION.

| | Total | FPR | | | |
|---|---|---|---|---|---|
| Size | non-AZB | QP 22 | QP 27 | QP 32 | QP 37 |
| 4 × 4 | 34,655,866 | 2.76% | 2.96% | 3.30% | 3.86% |
| 4 × 8 | 25,582,769 | 1.68% | 2.29% | 2.83% | 3.41% |
| 4 × 16 | 25,413,356 | 1.81% | 2.59% | 3.14% | 3.66% |
| 4 × 32 | 7,311,427 | 1.44% | 2.36% | 3.08% | 3.69% |
| 4 × 64 | 1,486,658 | 1.91% | 3.06% | 4.22% | 4.80% |
| 8 × 4 | 28,917,892 | 1.70% | 2.31% | 2.99% | 3.68% |
| 8 × 8 | 47,856,694 | 1.05% | 1.40% | 1.80% | 2.32% |
| 8 × 16 | 25,208,519 | 0.69% | 1.08% | 1.45% | 1.91% |
| 8 × 32 | 15,845,304 | 0.53% | 1.06% | 1.65% | 2.23% |
| 8 × 64 | 2,193,680 | 0.27% | 0.70% | 1.27% | 1.83% |
| 16 × 4 | 30,751,684 | 1.80% | 2.32% | 2.78% | 3.36% |
| 16 × 8 | 27,617,828 | 0.72% | 1.08% | 1.47% | 2.00% |
| 16 × 16 | 46,670,960 | 0.38% | 0.81% | 1.21% | 1.61% |
| 16 × 32 | 13,964,002 | 0.12% | 0.41% | 1.26% | 3.30% |
| 16 × 64 | 5,718,935 | 0.02% | 0.15% | 0.46% | 0.85% |
| 32 × 4 | 9,909,418 | 1.54% | 2.36% | 3.23% | 4.50% |
| 32 × 8 | 17,748,866 | 0.53% | 1.06% | 1.58% | 2.08% |
| 32 × 16 | 15,432,267 | 0.15% | 0.47% | 1.39% | 3.61% |
| 32 × 32 | 15,277,224 | 0.02% | 0.14% | 0.42% | 1.04% |
| 32 × 64 | 2,802,634 | 0.00% | 0.02% | 0.13% | 0.31% |
| 64 × 4 | 2,149,774 | 1.74% | 3.24% | 4.27% | 4.90% |
| 64 × 8 | 3,037,162 | 0.27% | 0.84% | 1.42% | 2.02% |
| 64 × 16 | 6,727,499 | 0.03% | 0.18% | 0.50% | 0.85% |
| 64 × 32 | 3,181,083 | 0.00% | 0.03% | 0.16% | 0.39% |
| 64 × 64 | 3,196,913 | 0.00% | 0.00% | 0.03% | 0.11% |

In summary, the AZB detection scheme as shown in FIG. 4 addresses the challenges posed by new coding tools in transform and quantization of the VVC coding standard. The novelty lies in that the characteristics of VVC are carefully considered in GAZB and PAZB detection, leading to an advanced AZB detection method that could accommodate diverse transform block sizes and trellis quantization in VVC. Extensive experiments demonstrate promising encoding time savings for various test sequences with negligible rate-distortion performance loss. Thus, there is demonstrated a potential for reducing video encoding complexity in VVC and contributes to advancement in the applications of the VVC standard for real-time scenarios. Future research can be directed towards adapting the proposed method to diverse scenarios, such as screen content video and ultra-high resolution video. Additionally, considering the impact of TCQ on encoding time, it becomes crucial to develop an optimal or near-optimal quantization solution with low complexity, such as a learning-based model that can directly anticipate the quantized signal from the residual signal. Consequently, there exists a notable demand for a lightweight model that can effectively address this issue, as the potential of incorporating low-complexity transform and quantization techniques will significantly enhance the efficiency and speed of encoding in the prevailing video standard.

The exemplary embodiments are thus fully described. Although the description referred to particular embodiments, it will be clear to one skilled in the art that the invention may be practiced with variation of these specific details. Hence this invention should not be construed as limited to the embodiments set forth herein.

While the embodiments have been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

For example, a person of ordinary skill in the art may realize that certain module(s) (for example the computing section) and method steps of the various examples described in connection with the embodiments disclosed herein may be realized by electronic hardware, computer software, or a combination of both, and in order to clearly illustrate the interchangeability of the hardware and the software, the module(s) and the steps of the various examples have been described in the foregoing description in general terms according to the functions. Whether these functions are performed in hardware or software depends on the particular application and design constraints of the technical solution. The skilled person may use different methods for each particular application to implement the described functions, but such implementations should not be considered outside the scope of the invention.

The functional units and modules that involve computations in accordance with the embodiments disclosed herein may be implemented using computing devices, computer processors, or electronic circuitries including but not limited to application-specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

The embodiments include computer storage media, transient and non-transient memory devices having computer instructions or software codes stored therein which can be used to program computers or microprocessors to perform any of the processes of the present invention. The storage media, transient and non-transitory computer-readable storage medium can include but are not limited to floppy disks, optical discs, Blu-ray Disc, DVD, CD-ROMs, magneto-optical disks, ROMs, RAMs, flash memory devices, or any type of media or devices suitable for storing instructions, codes, and/or data.

In the exemplary embodiments described above, it should be understood that the systems, devices and methods as disclosed may be realized in other ways. For example, the separation between internal components that are described above is merely a logical function separation, and in actual implementations the components may be separated in other ways, e.g., a plurality of units or components may be combined or may be integrated into another system, or some features may be ignored, or not implemented. Furthermore, coupling or direct coupling or communication connection between the units or components shown or discussed may also be indirect coupling or communication connection through some interface, device or unit, or may be connected electrically, mechanically or in some other form.

What is claimed is:

1. An all-zero block (AZB) detection method for a video coding framework before a transform phase and/or a quantization phase of the video coding framework; the video coding framework comprising trellis-coded quantization (TCQ) and non-square transform blocks; the method comprising:

a) detecting if a residual signal comprises a spatial domain genuine all-zero block (GAZB), which comprises detecting if the residual signal comprises a non-square GAZB;

b) detecting if the residual signal comprises a frequency domain GAZB, if no said spatial domain GAZB is detected in Step a);

c) detecting if the residual signal comprises a pseudo-AZB (PAZB) introduced by the TCQ, if no said frequency domain GAZB is detected in Step b); and d) determining that the residual signal is a non-AZB signal if no PAZB is detected in Step c).

2. The AZB detection method of claim 1, further comprises, before Step a), a step of validating a distribution of multiple said residual signals for both square and non-square residual blocks.

3. The AZB detection method of claim 2, wherein the distribution is approximated by a Laplacian distribution.

4. The AZB detection method of claim 1, wherein Step a) further comprises a step of assessing if a sum of absolute differences (SAD) of the residual signal is smaller than an SAD upper threshold, and a step of determining that the residual signal comprises the spatial domain GAZB if the SAD is smaller than the SAD upper threshold.

5. The AZB detection method of claim 4, wherein the SAD upper threshold is derived at least based on a theoretical coefficient upper bound in a frequency domain.

6. The AZB detection method of claim 4, wherein the SAD upper threshold is derived at least based on a block size of the residual signal.

7. The AZB detection method of claim 5, wherein both the SAD upper threshold and the theoretical coefficient upper bound are determined only by a block size of the residual signal, a Quantization Parameter (QP), and a transform type.

8. The AZB detection method of claim 5, wherein both the upper threshold and the theoretical coefficient upper bound are pre-calculated and stored in a look-up table prior to Step a).

9. The AZB detection method of claim 1, wherein Step b) further comprises a step of assessing if a last significant coefficient in a transform block of the residual signal is larger than a theoretical coefficient upper bound in a frequency domain, and a step of determining that the residual signal comprises the frequency domain GAZB if the last significant coefficient is larger than the theoretical coefficient upper bound.

10. The AZB detection method of claim 9, wherein the last significant coefficient is determined by applying the theoretical coefficient upper bound to each transform coefficient in inverse scan order.

11. The AZB detection method of claim 1, wherein Step b) further comprises a step of attempting to find a last significant coefficient in a transform block of the residual signal, and a step of determining that the residual signal comprises the frequency domain GAZB if no said last significant coefficient can be found.

12. The AZB detection method of claim 1, further comprises, after Step b), a step of building a trellis graph from a last significant coefficient in a transform block of the residual signal to a top-left significant coefficient.

13. The AZB detection method of claim 1, wherein Step c) further comprises a step of determining if the residual signal comprises the PAZB or comprises no AZB by using a rate-distortion (RD) estimation.

14. The AZB detection method of claim 13, wherein for the TCQ a path with a smallest RD cost is chosen in Step c).

15. The AZB detection method of claim 13, wherein Step c) further comprises detecting if the residual signal comprises the PAZB, by assessing whether a smallest RD cost occurs when all indices are quantized to zeros.

16. The AZB detection method of claim 1, wherein Step c) further comprises a step of calculating if a ratio of large coefficients is larger than a theoretical coefficient upper bound in a frequency domain; and a step of determining that the residual signal comprises the PAZB if the ratio is larger than the theoretical coefficient upper bound.

17. A non-transitory computer-readable medium, having stored thereon program instructions that, upon execution by a computing device, cause the computing device to perform the method according to claim 1.

18. A computing system comprising:

a) one or more processors; and b) memory containing instructions that, when executed by the one or more processors, cause the computing system to perform the method according to claim 1.

* * * * *